(No Model.) 20 Sheets—Sheet 2.
T. B. FULLER.
BAG STITCHING MACHINE.
No. 577,740. Patented Feb. 23, 1897.
Fig. II.
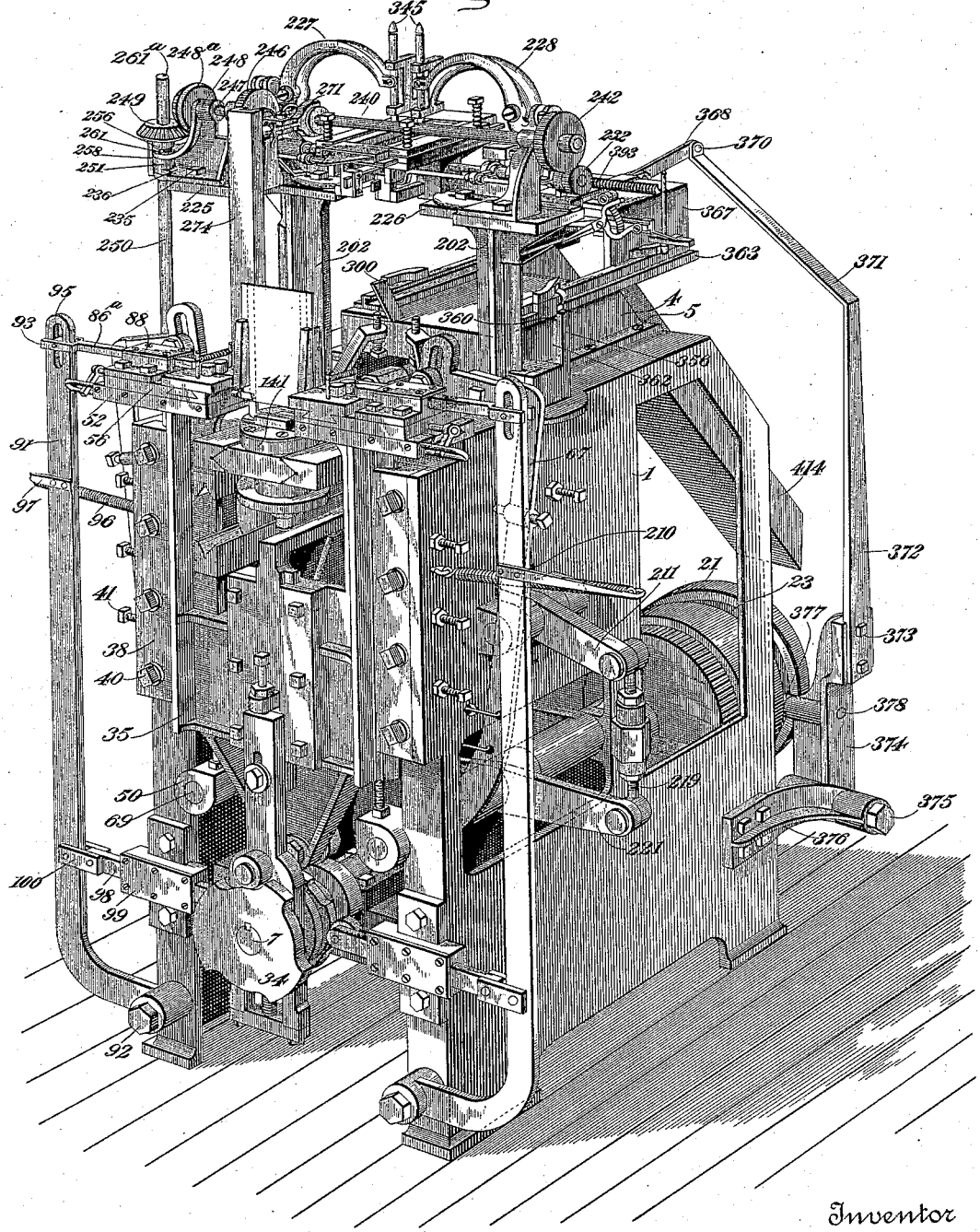
Witnesses
M. E. Fowler
S. N. Acker
Inventor
Thomas B. Fuller
By Joseph L. Atkins
Attorney.

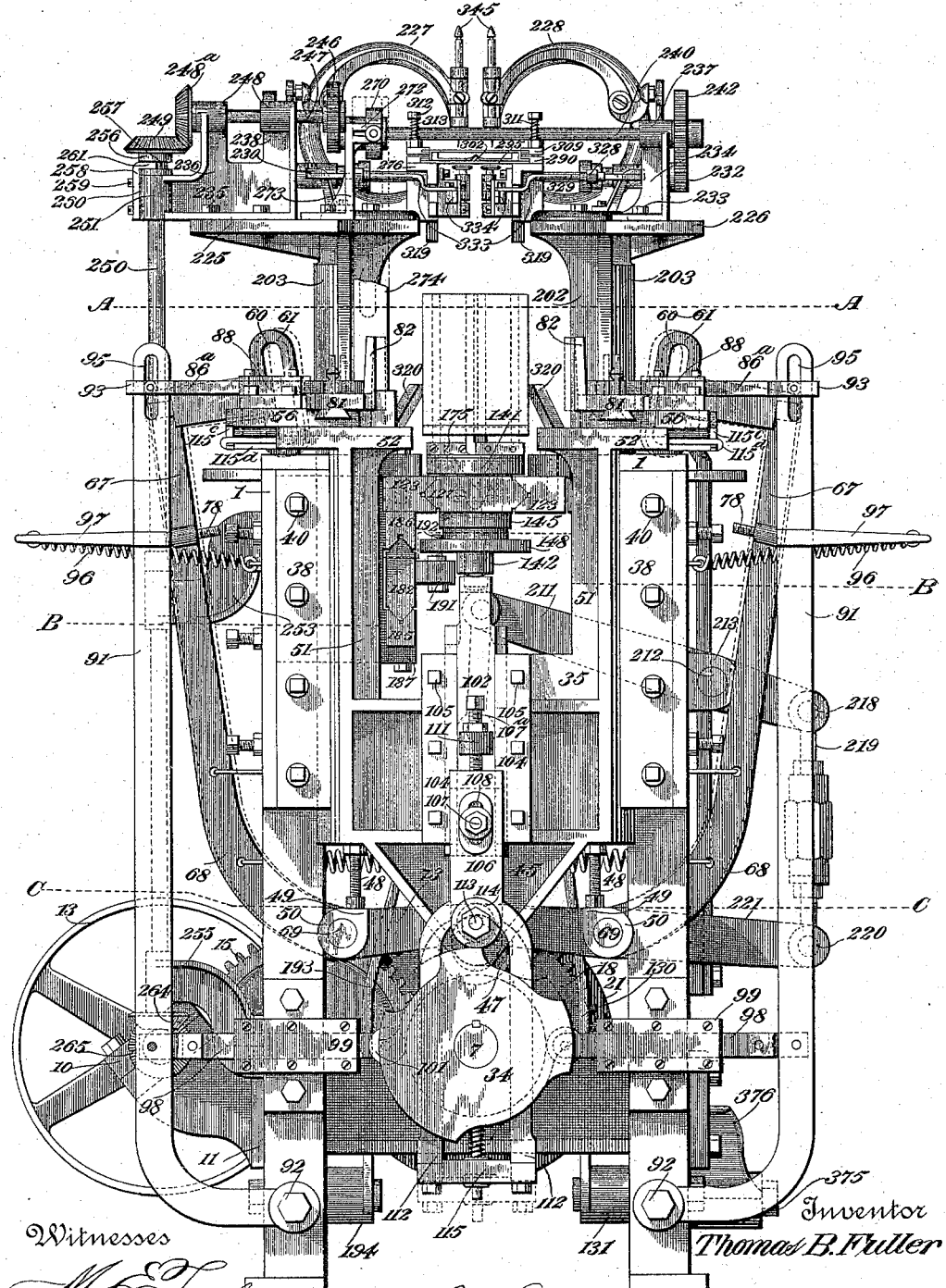

(No Model.) 20 Sheets—Sheet 3.
T. B. FULLER.
BAG STITCHING MACHINE.
No. 577,740. Patented Feb. 23, 1897.
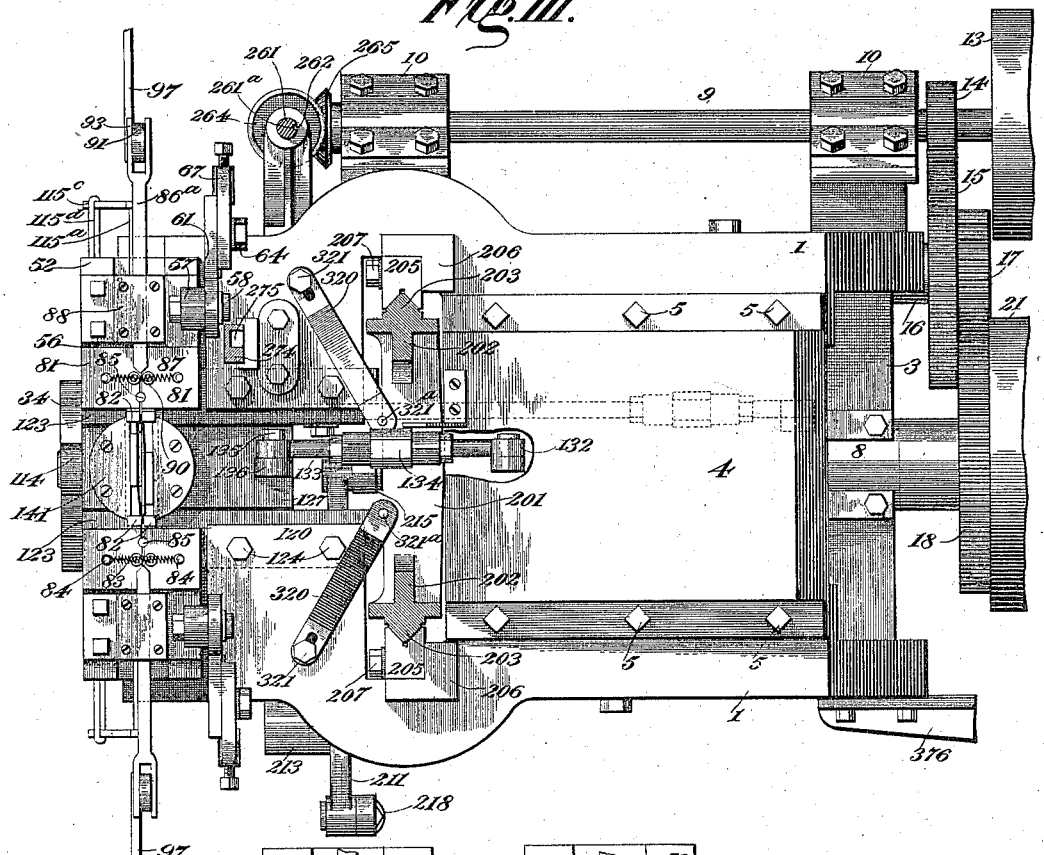
Fig. III.
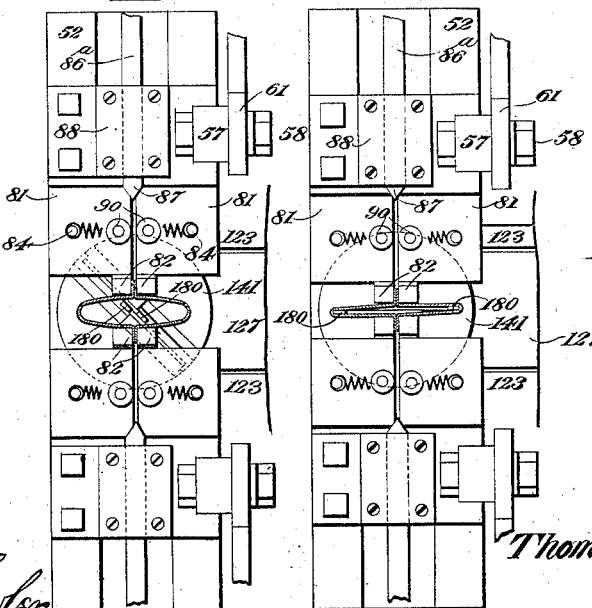
Fig. IV.   Fig. V.
Witnesses
M. E. Fowler
L. Mackey
Inventor
Thomas B. Fuller
By James L. Atkins, Attorney.
THE NORRIS PETERS CO., PHOTO-LITHO., WASHINGTON, D. C.

(No Model.) 20 Sheets—Sheet 4.
T. B. FULLER.
BAG STITCHING MACHINE.
No. 577,740. Patented Feb. 23, 1897.
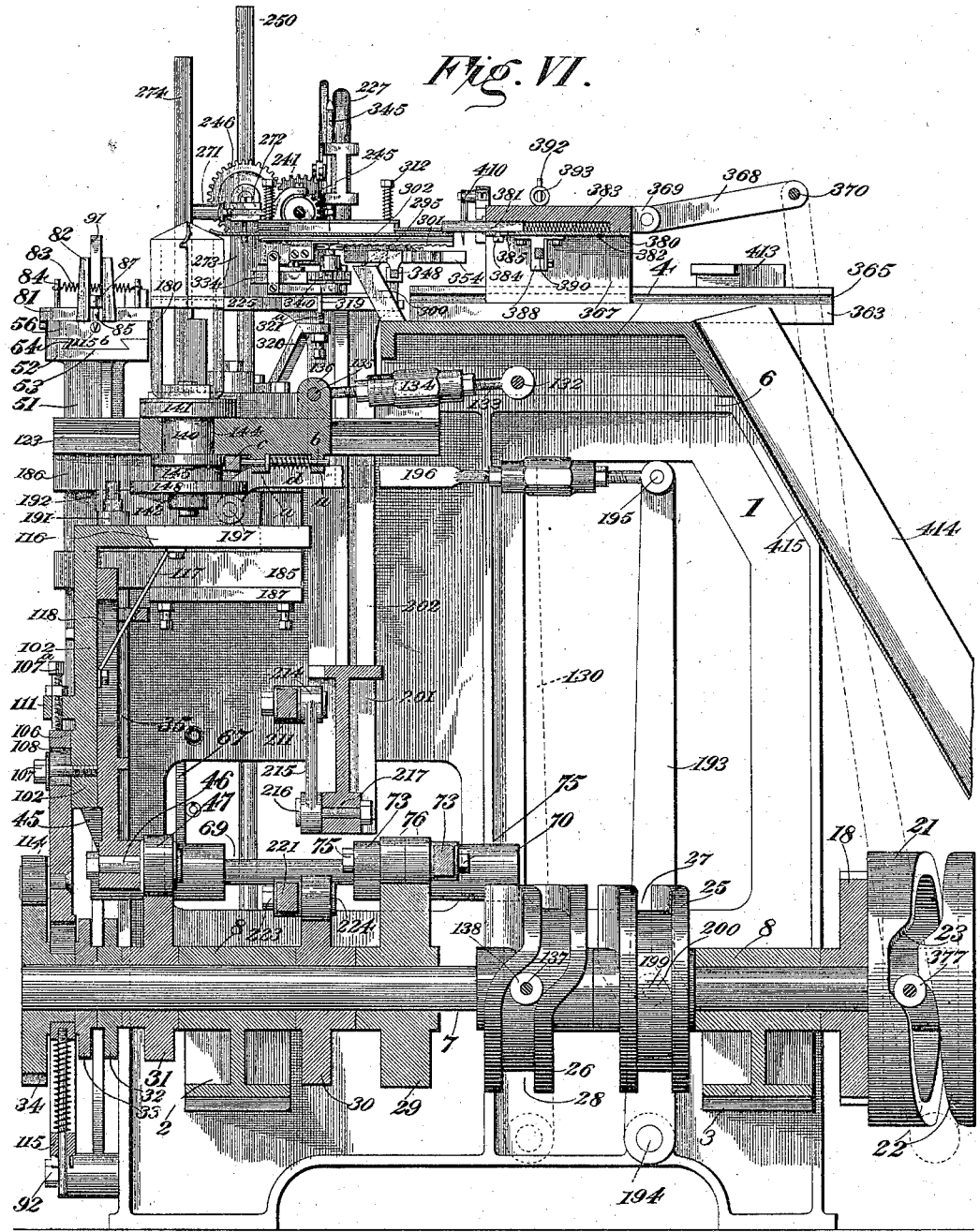
Fig. VI.
Witnesses
M. E. Fowler
S. N. Aiken
Inventor
Thomas B. Fuller
By Joseph L. Atkins,
Attorney.

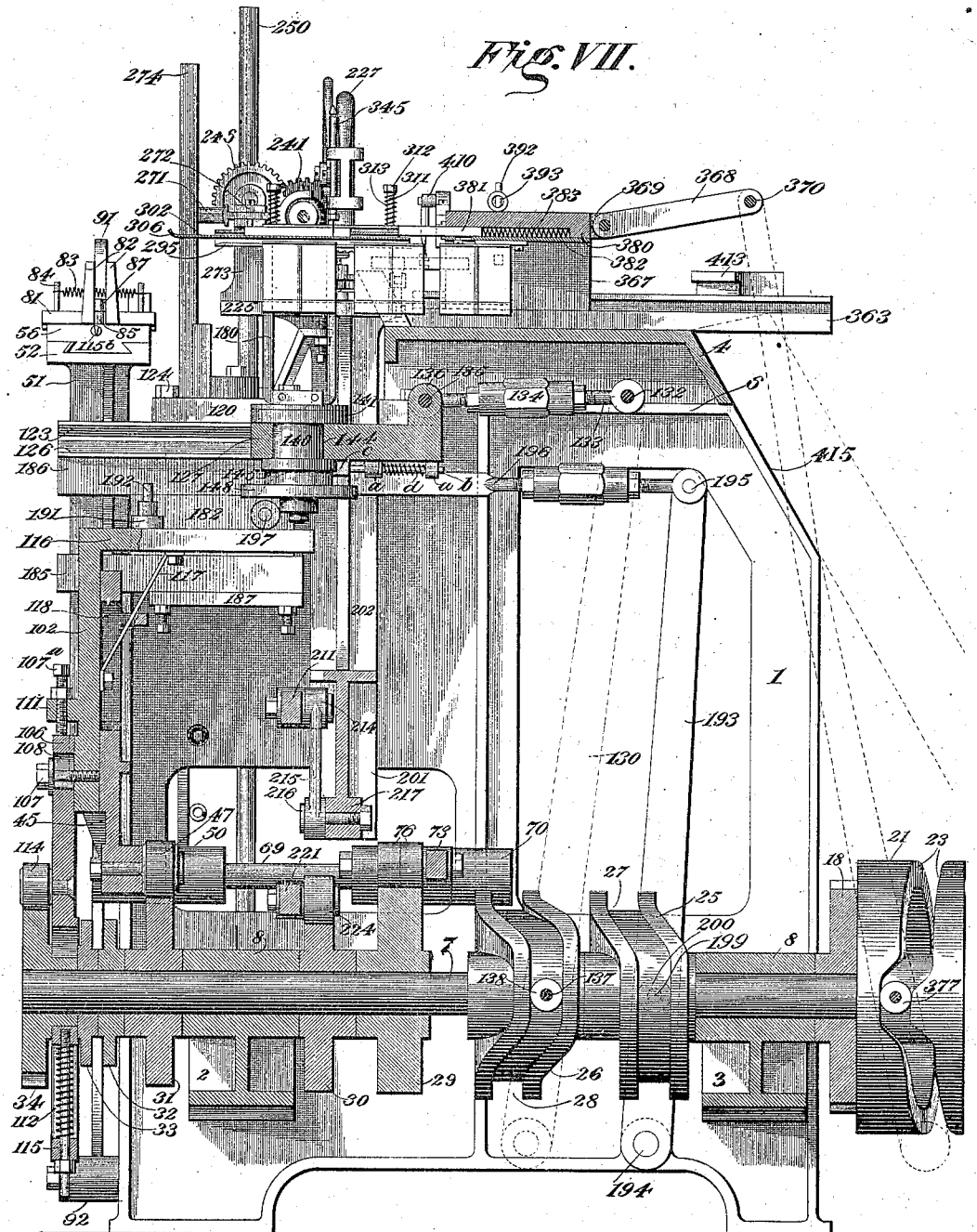

(No Model.) 20 Sheets—Sheet 6.
T. B. FULLER.
BAG STITCHING MACHINE.
No. 577,740. Patented Feb. 23, 1897.
*Fig. VIII.*
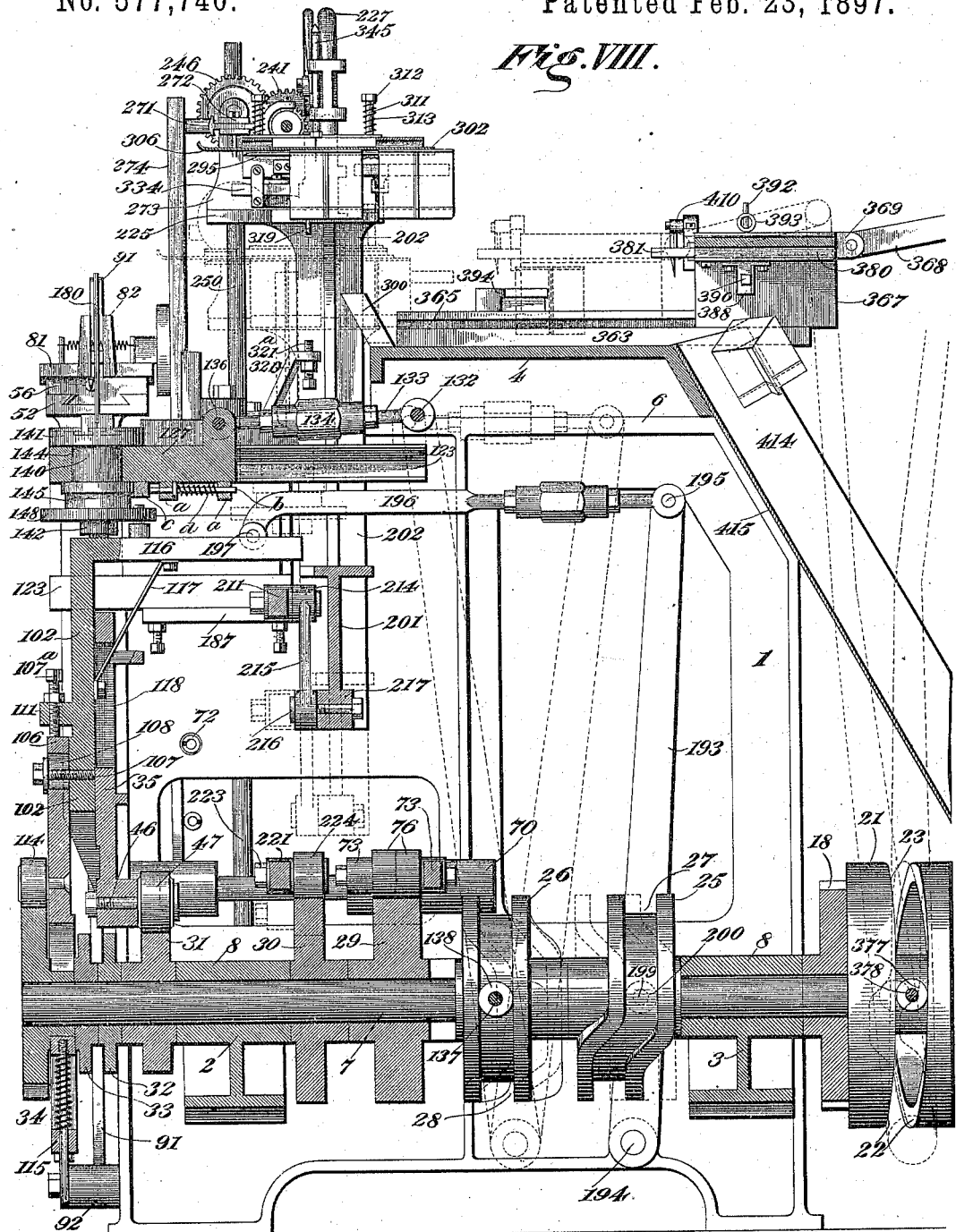
Witnesses
M. E. Fowler
S. N. Acker
Inventor
Thomas B. Fuller
By Joseph T. Atkins
Attorney (No Model.) 20 Sheets—Sheet 7.
T. B. FULLER.
BAG STITCHING MACHINE.
No. 577,740. Patented Feb. 23, 1897.
Fig. IX.
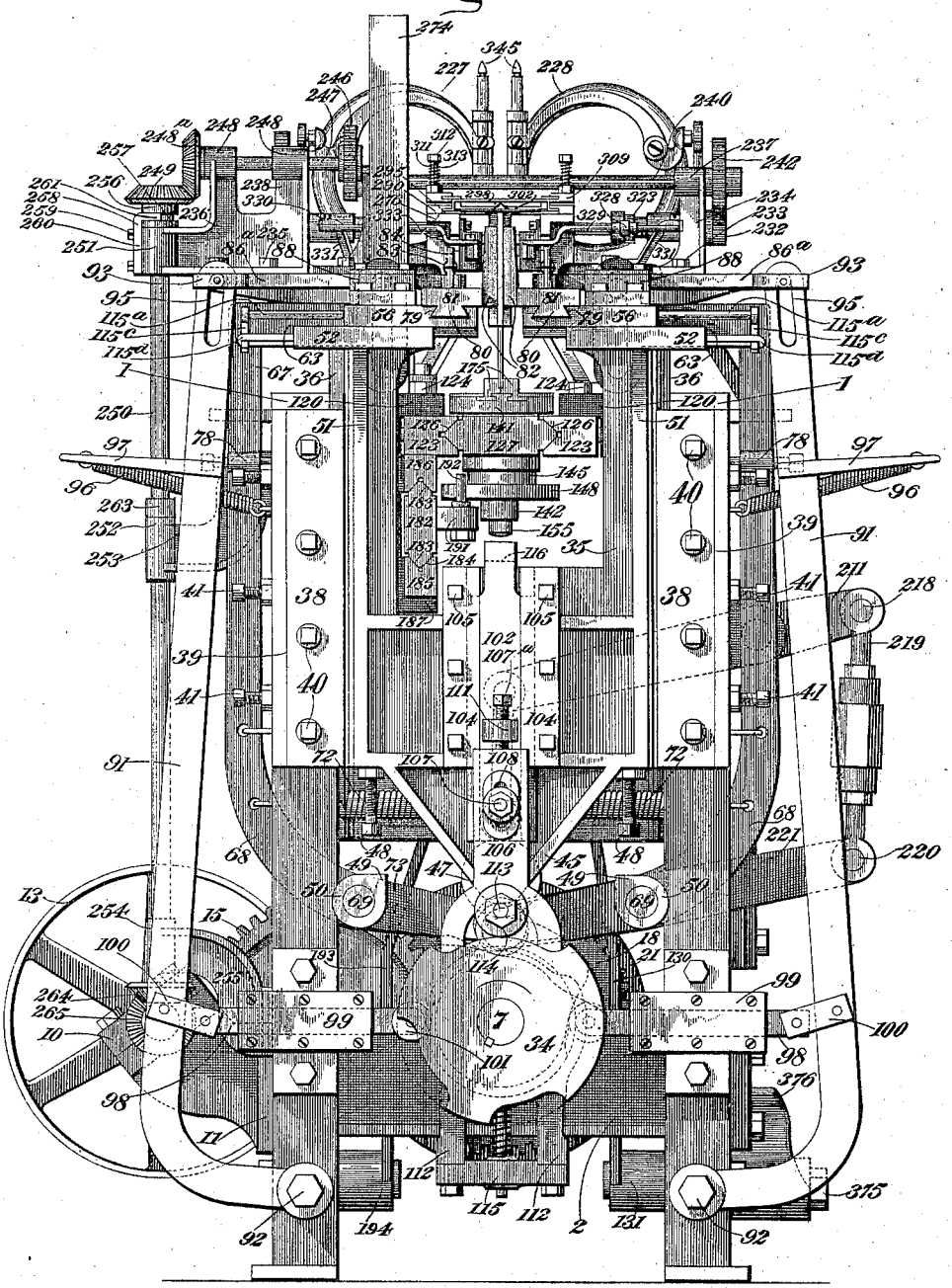
Witnesses
M. E. Fowler
S. N. Acker
Inventor
Thomas B. Fuller
By Joseph T. Atkins
Attorney

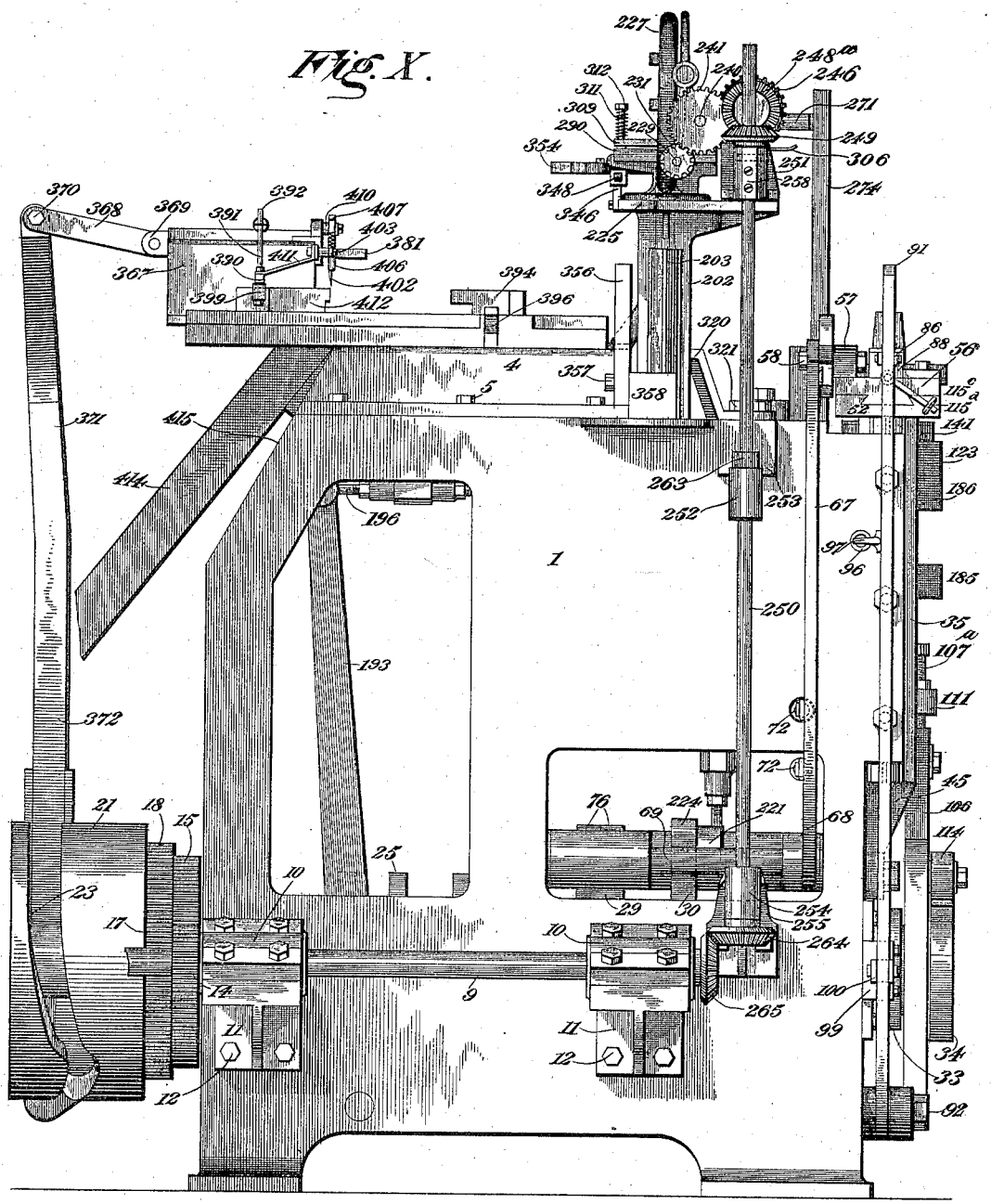

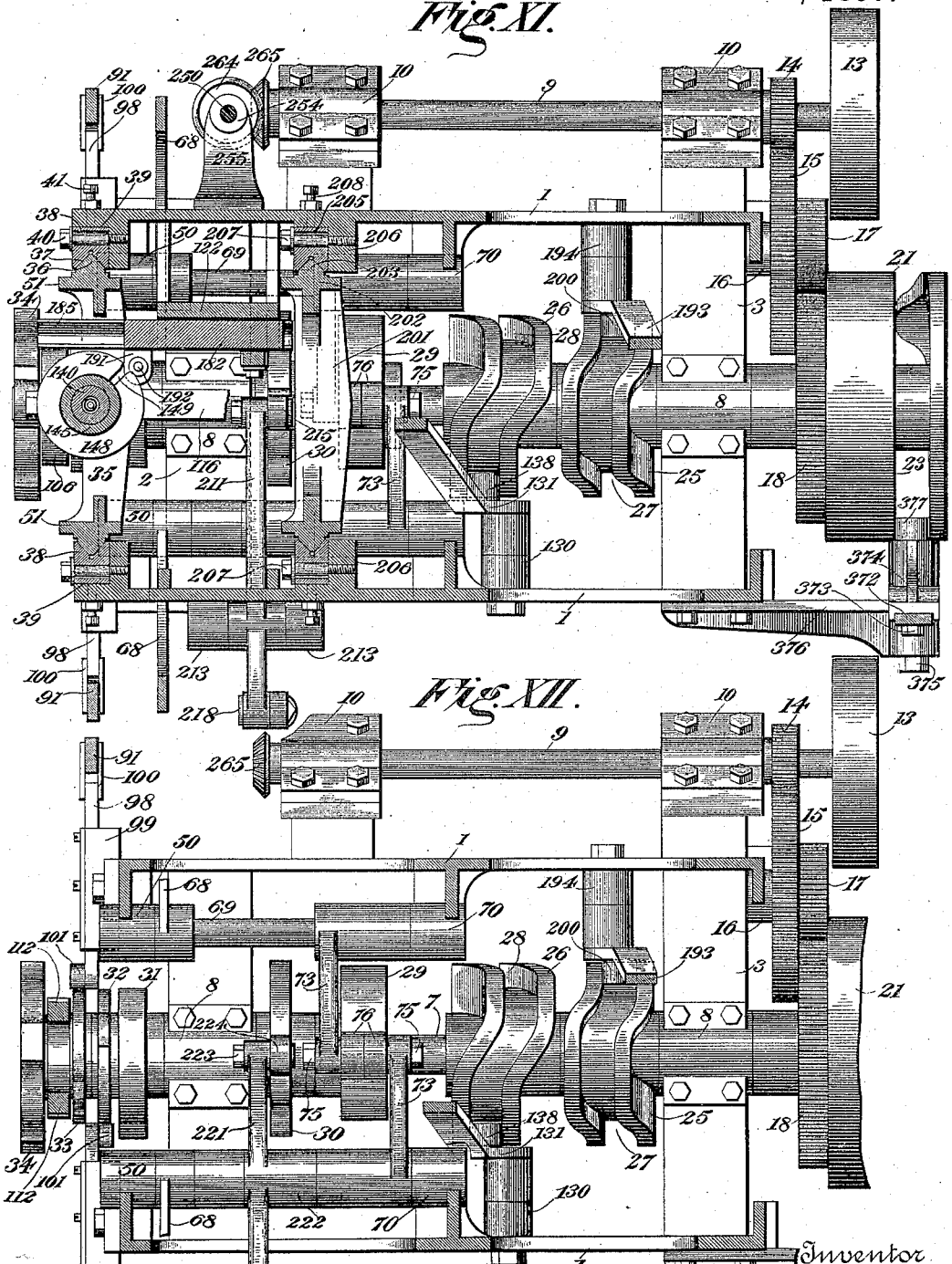

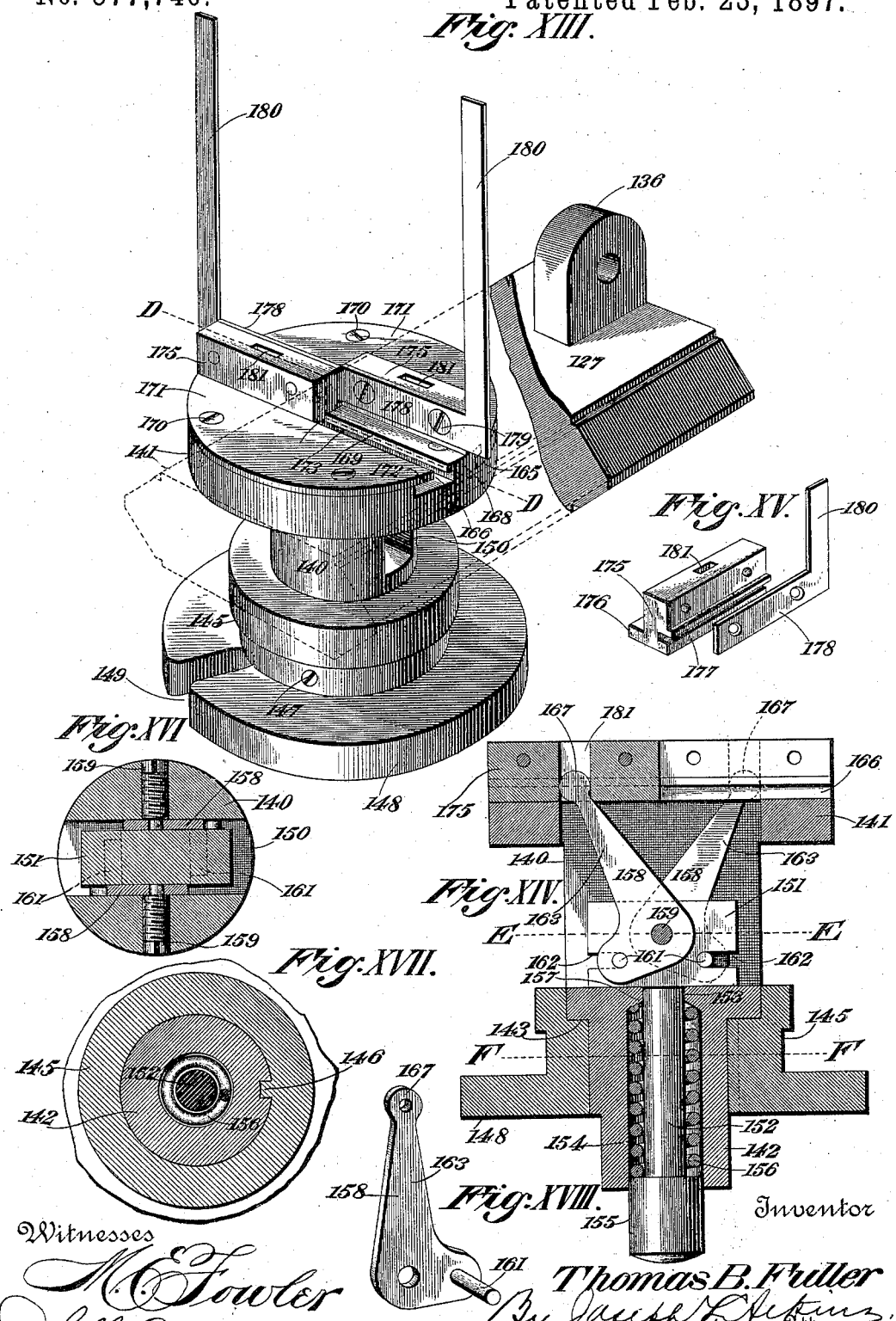

(No Model.) 20 Sheets—Sheet 11.
T. B. FULLER.
BAG STITCHING MACHINE.
No. 577,740. Patented Feb. 23, 1897.
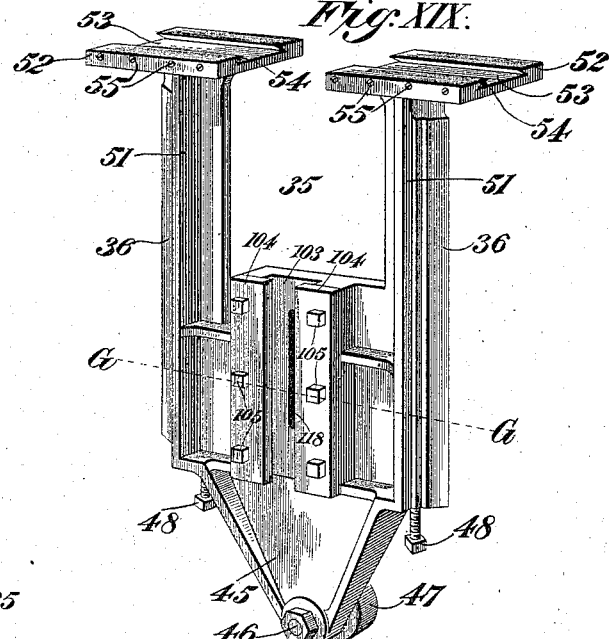
Fig. XIX.
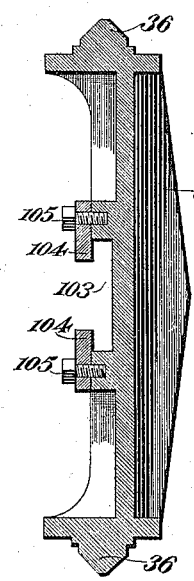
Fig. XX.
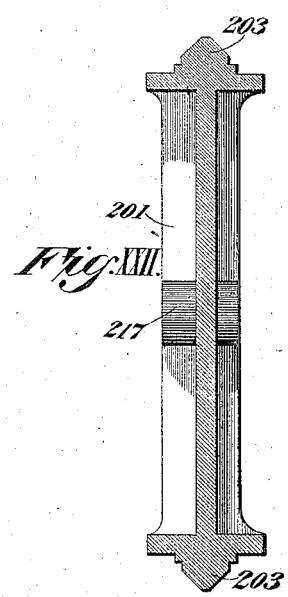
Fig. XXII.
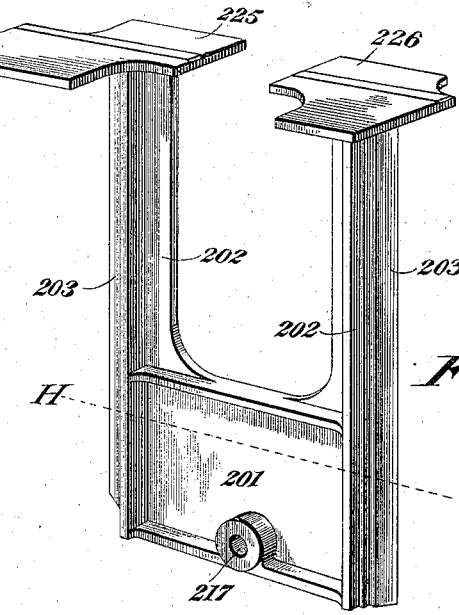
Fig. XXI.
Witnesses
M. Fowler
S. Macker
Inventor
Thomas B. Fuller
By Joseph L. Atkins
Attorney.

(No Model.) 20 Sheets—Sheet 12.
T. B. FULLER.
BAG STITCHING MACHINE.
No. 577,740. Patented Feb. 23, 1897.
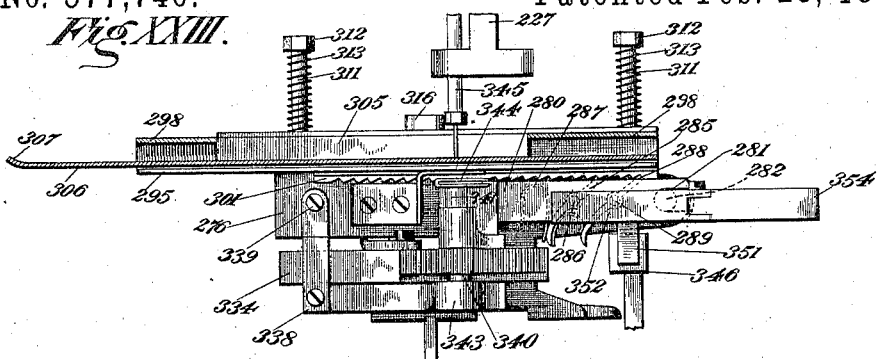
Fig. XXIII.
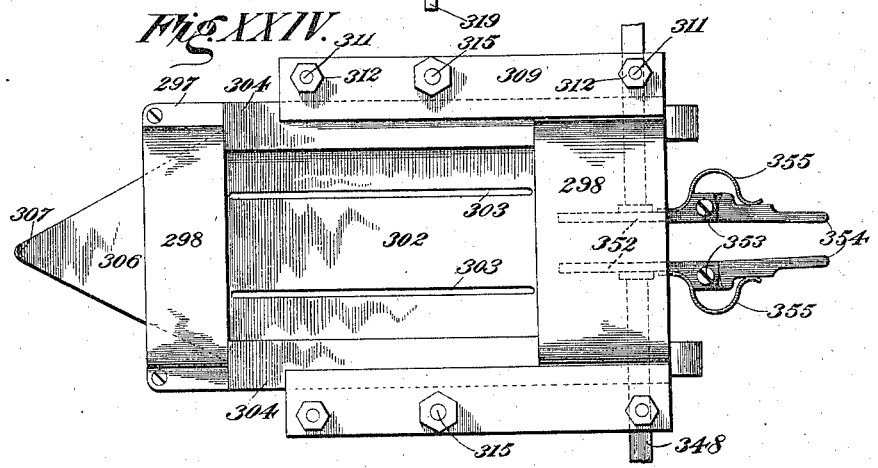
Fig. XXIV.
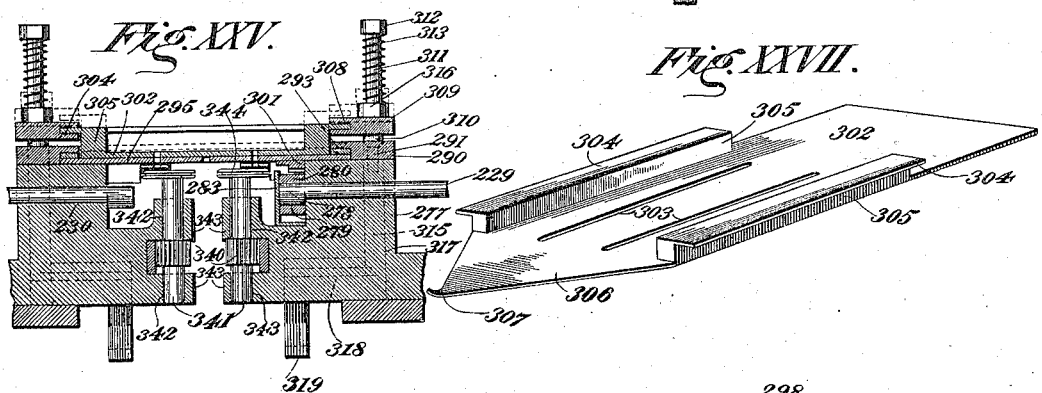
Fig. XXV. Fig. XXVII.
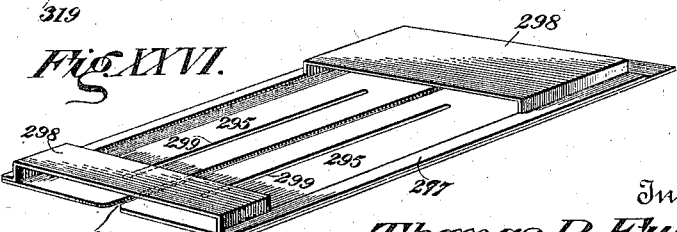
Fig. XXVI.
Witnesses
M. Fowler
S. M. Acker
Inventor
Thomas B. Fuller
By Joseph L. Atkins
Attorney
THE NORRIS PETERS CO., PHOTO-LITHO., WASHINGTON, D. C.

(No Model.)
20 Sheets—Sheet 13.
T. B. FULLER.
BAG STITCHING MACHINE.
No. 577,740.
Patented Feb. 23, 1897.
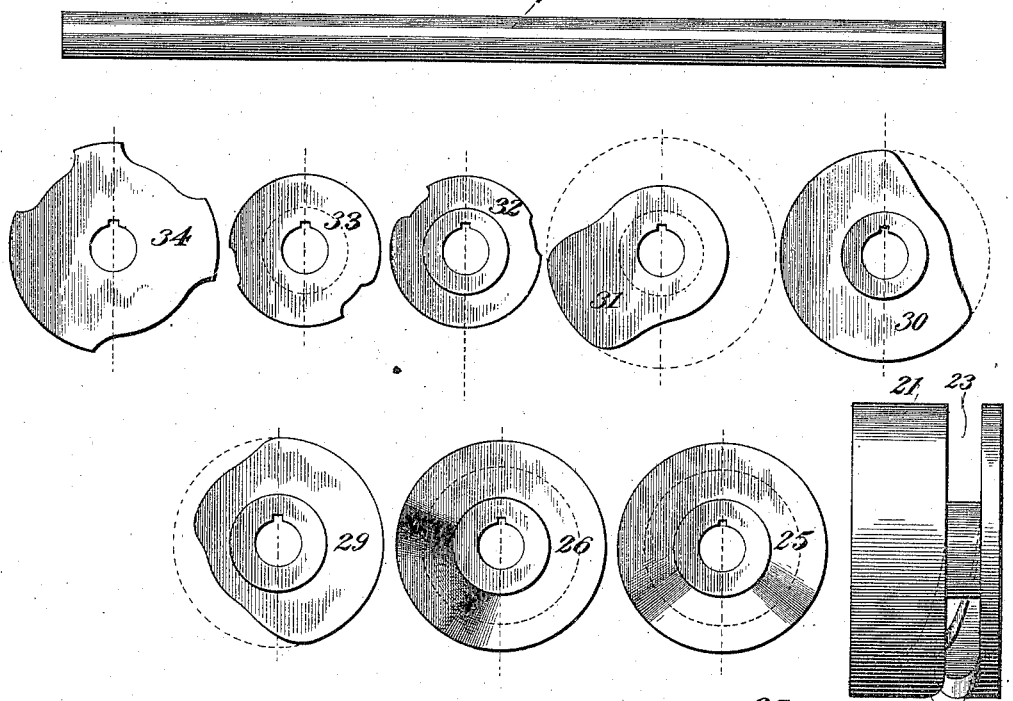
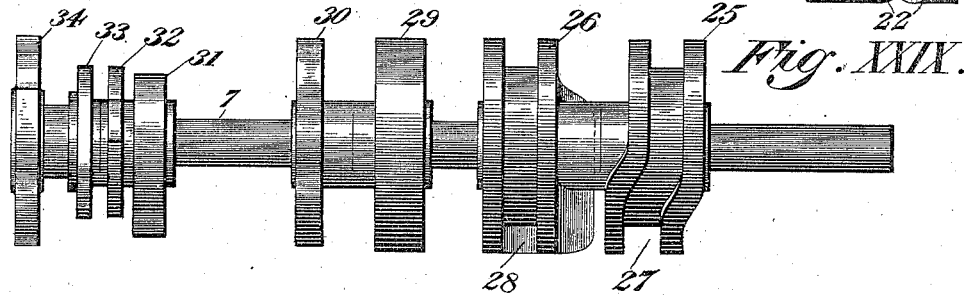
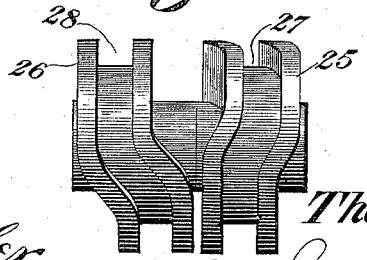
Witnesses
M. E. Fowler
S. Macket
Inventor
Thomas B. Fuller
By Joseph L. Atkins,
Attorney.

(No Model.)  T. B. FULLER.  20 Sheets—Sheet 14.
BAG STITCHING MACHINE.
No. 577,740.  Patented Feb. 23, 1897.
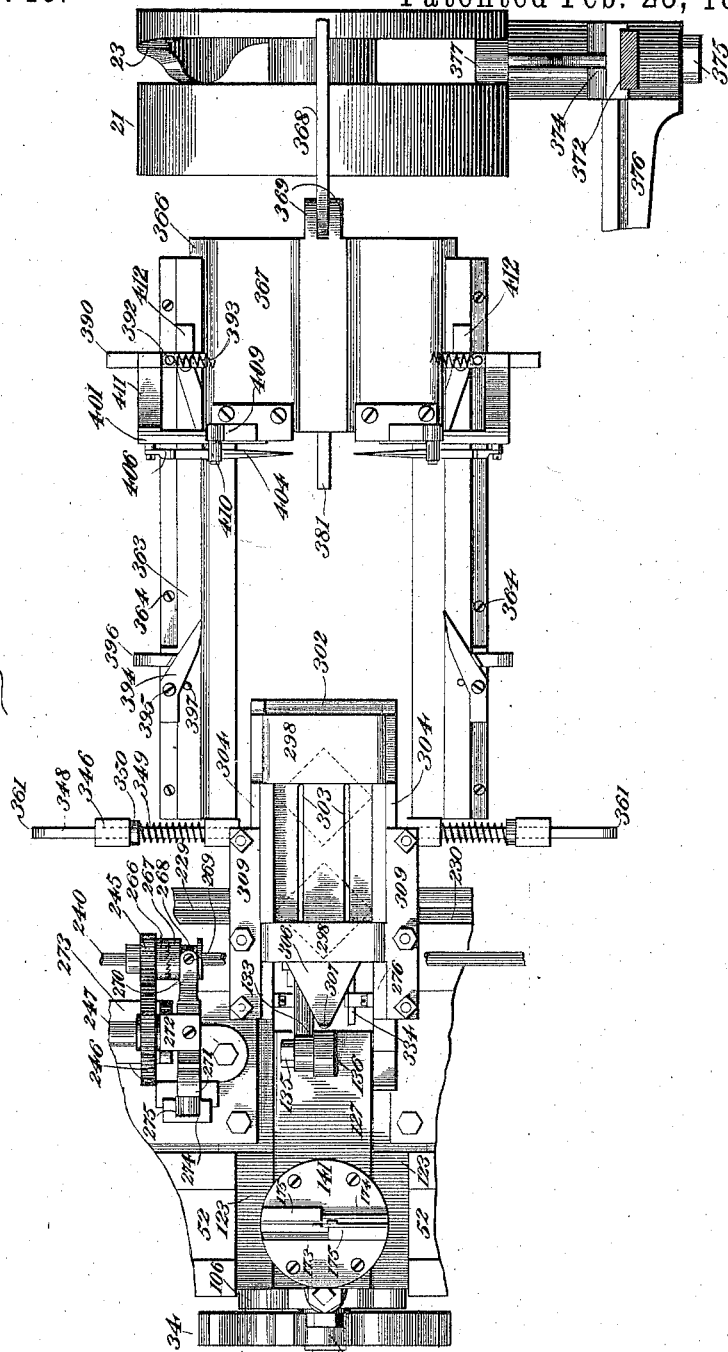
Fig. XXXI.
Witnesses
M. E. Fowler
S. Mackie
Inventor
Thomas B. Fuller
By Joseph T. Atkin
Attorney.

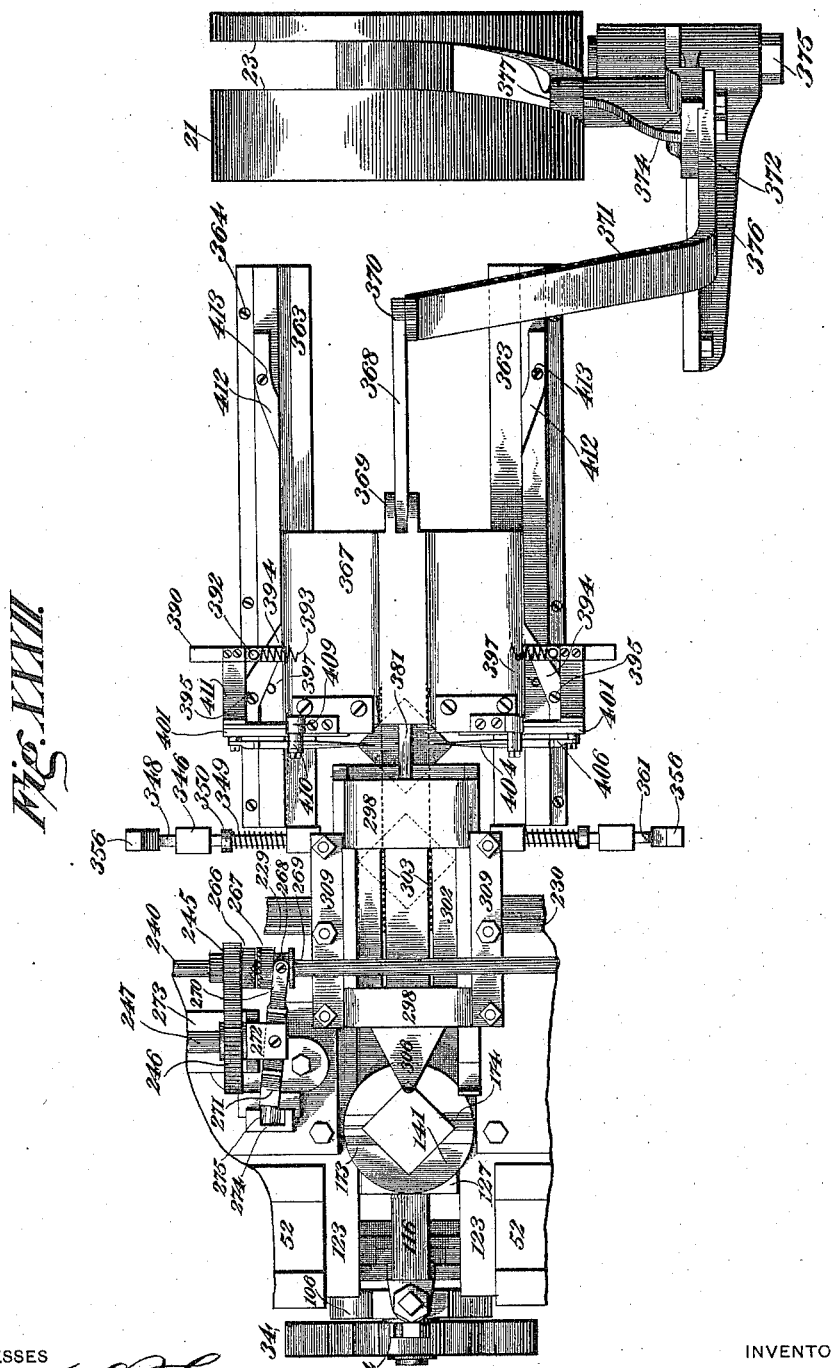

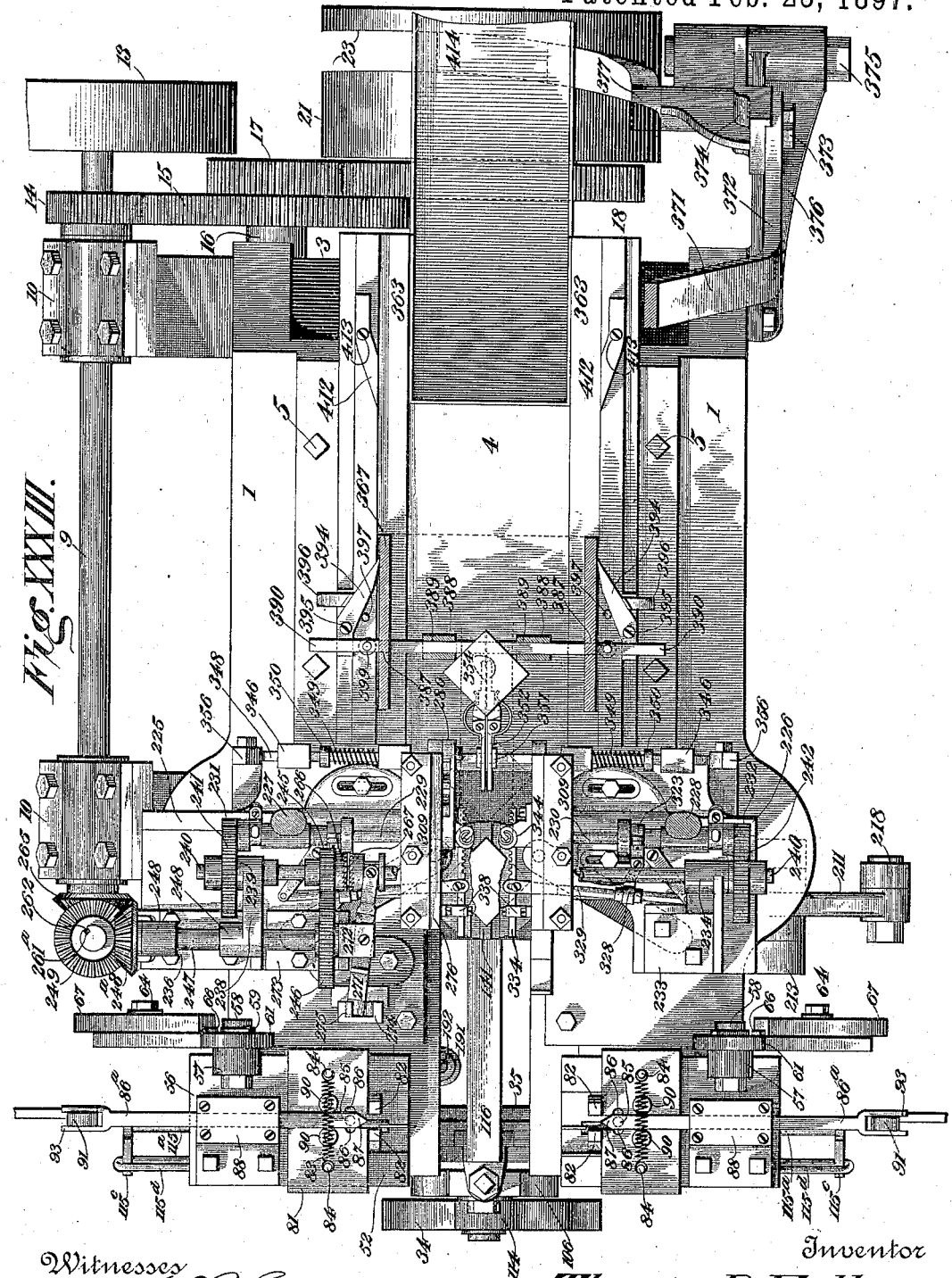

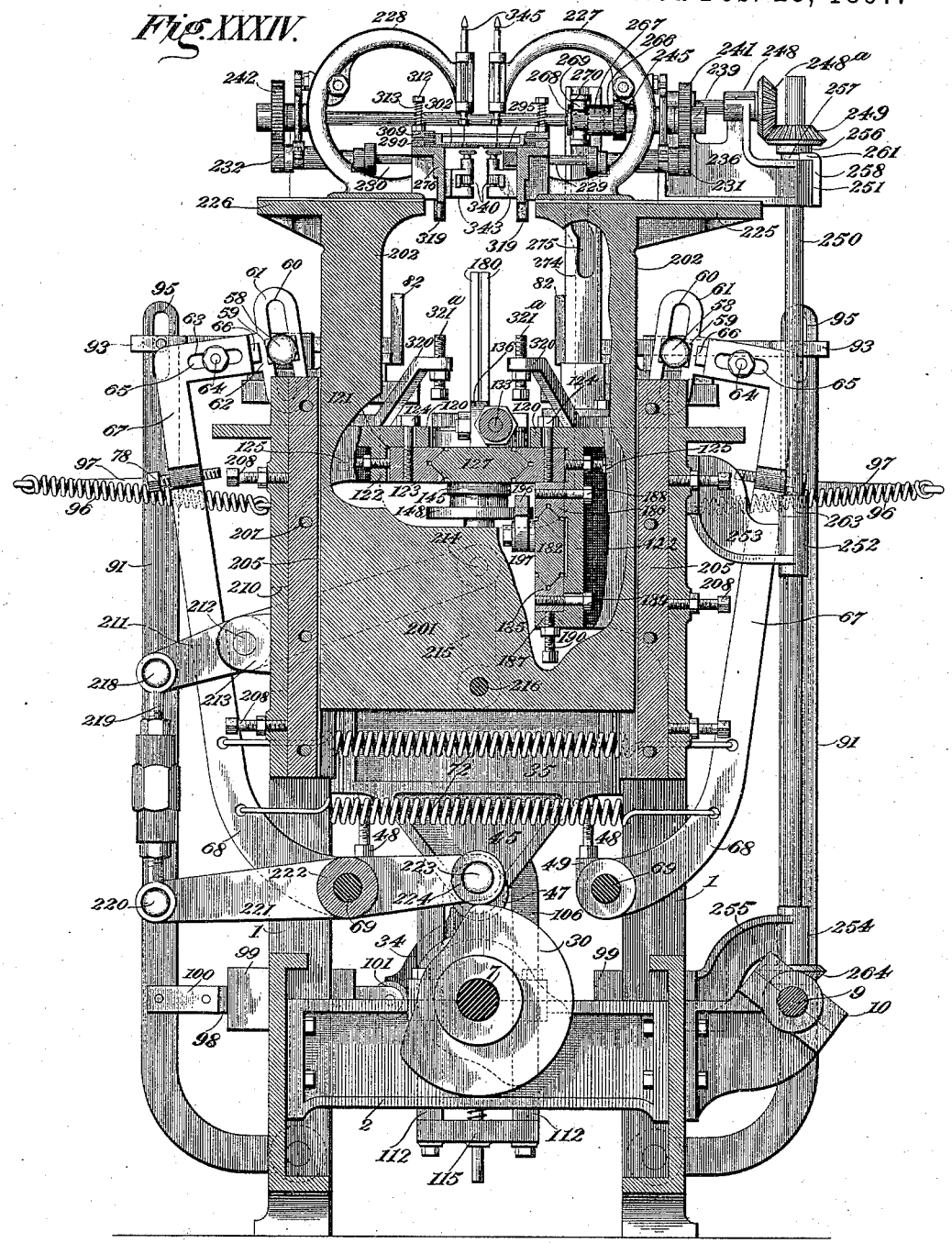

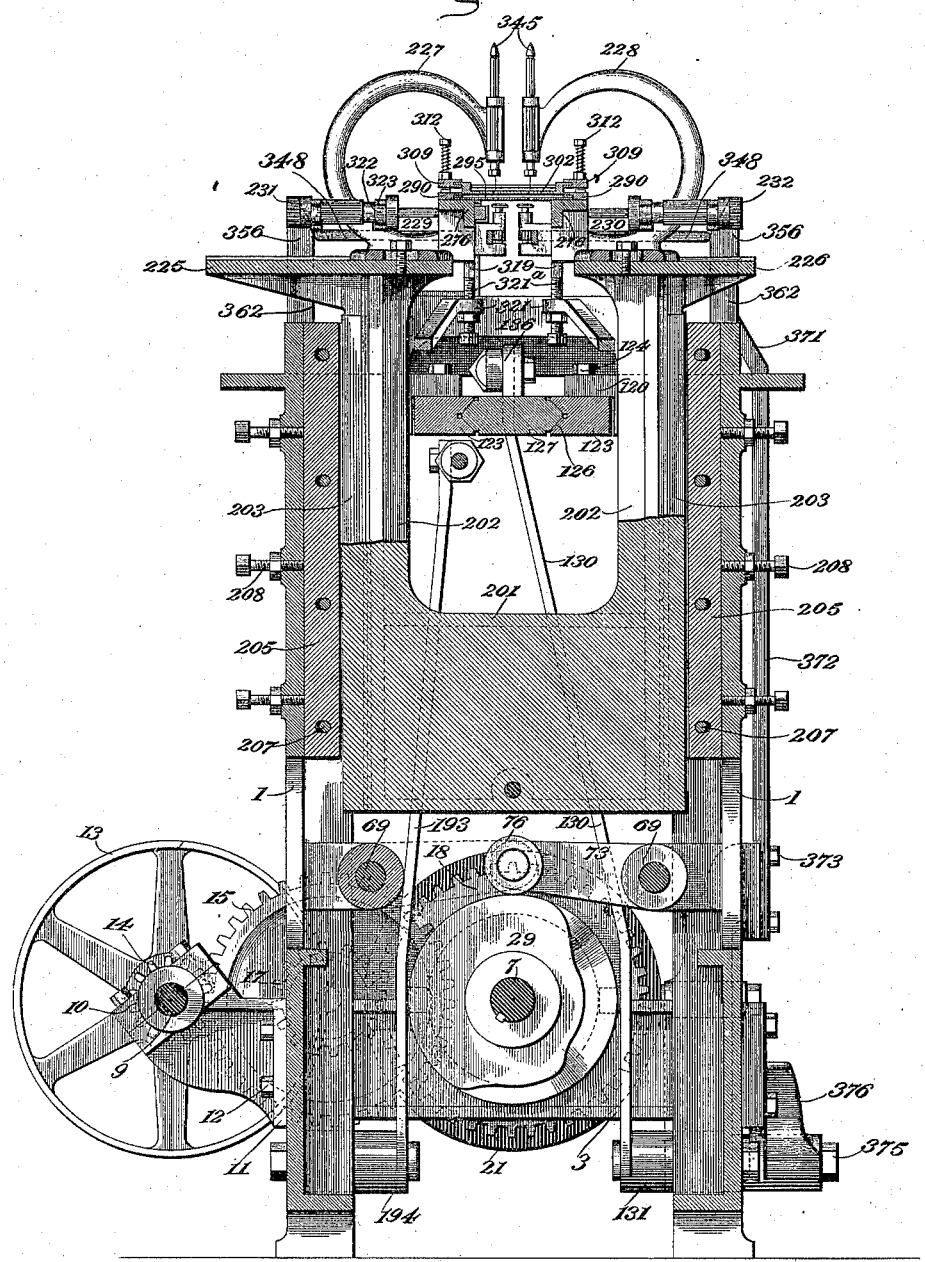

(No Model.) 20 Sheets—Sheet 19.
T. B. FULLER.
BAG STITCHING MACHINE.
No. 577,740. Patented Feb. 23, 1897.
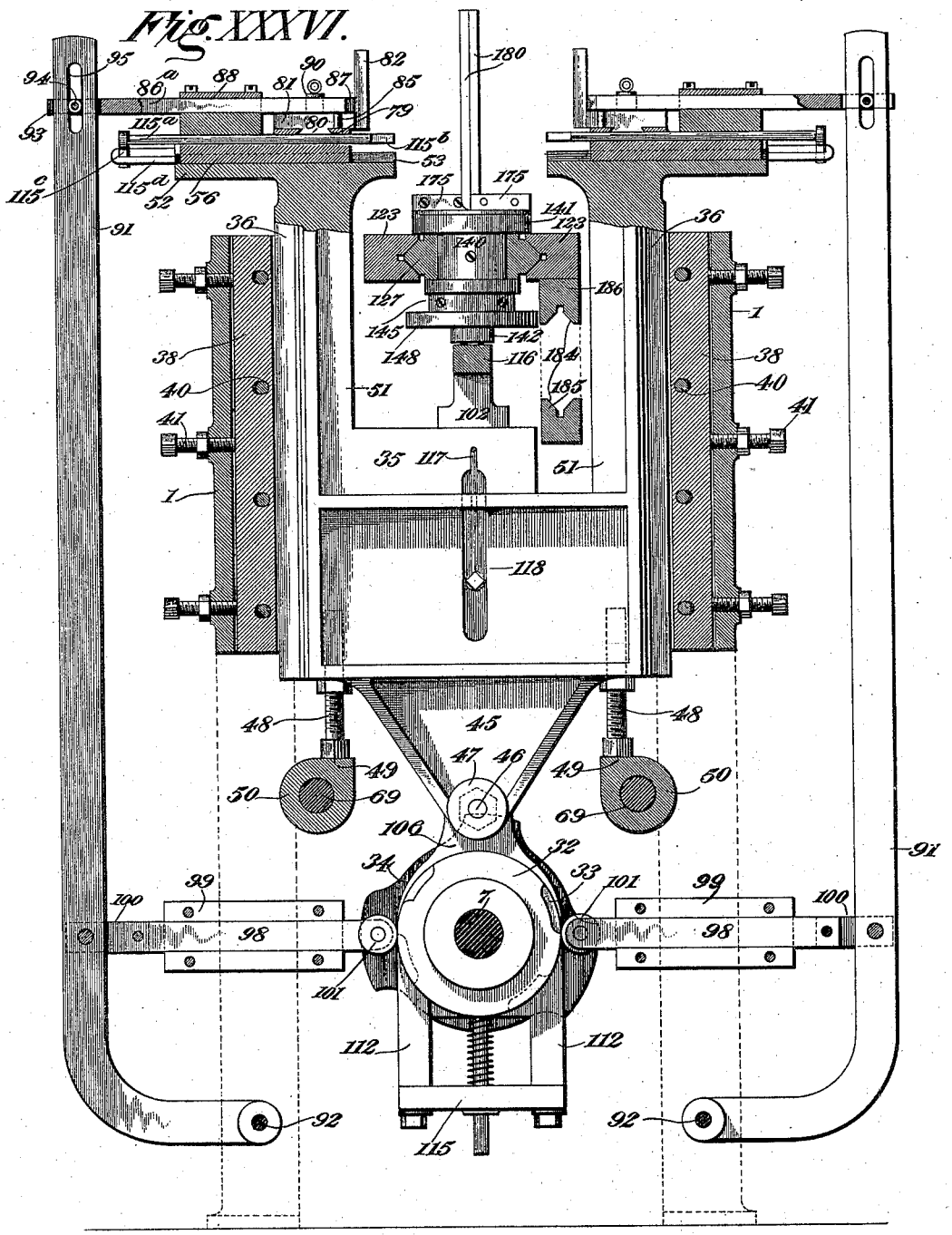
Fig. XXXVI.
WITNESSES
M. E. Fowler
S. N. Acker
INVENTOR
Thomas B. Fuller
By Joseph T. Atkins,
Attorney.

(No Model.)   20 Sheets—Sheet 20.
T. B. FULLER.
BAG STITCHING MACHINE.
No. 577,740.   Patented Feb. 23, 1897.
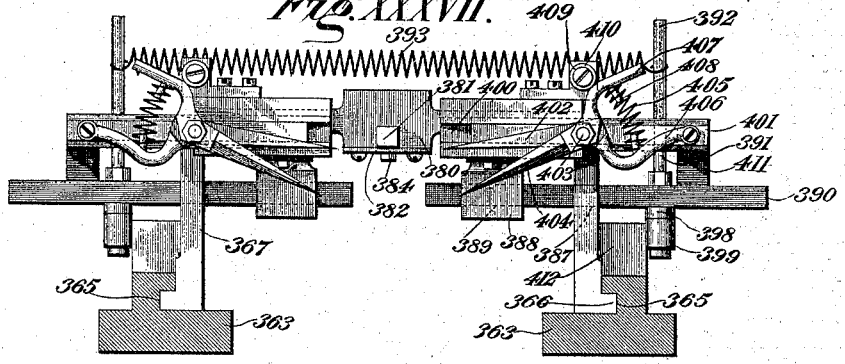
Fig. XXXVII.
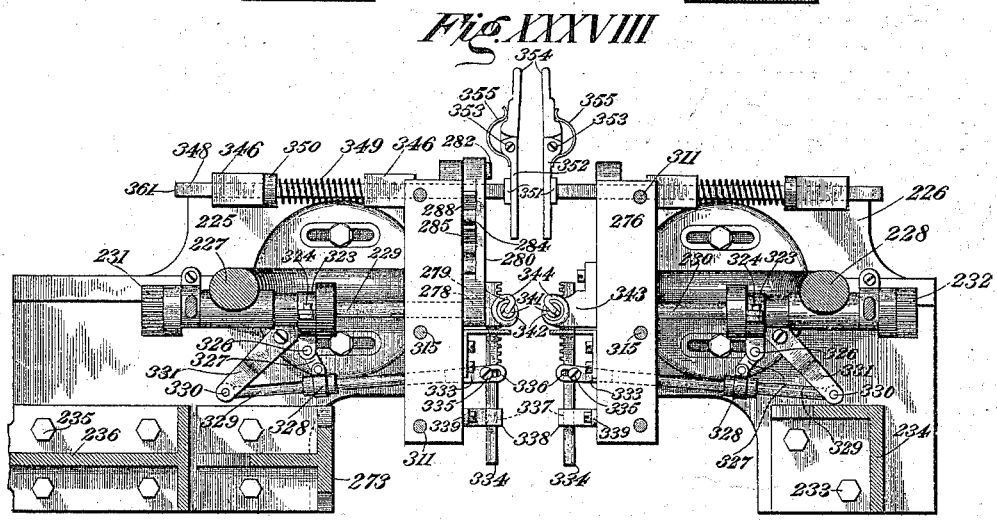
Fig. XXXVIII
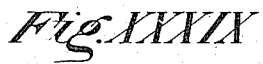
Fig. XXXIX
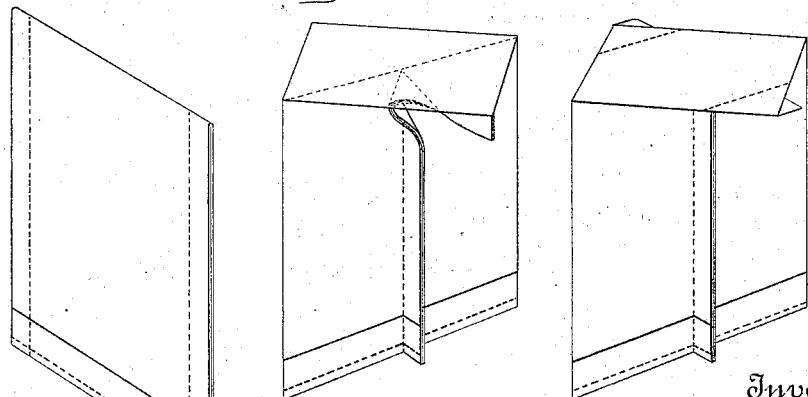
Witnesses
M. E. Fowler
S. M. Acker
Inventor
Thomas B. Fuller
By Joseph L. Atkins
Attorney
THE NORRIS PETERS CO., PHOTO-LITHO., WASHINGTON, D. C.

United States Patent Office.

THOMAS B. FULLER, OF DURHAM, NORTH CAROLINA.

BAG-STITCHING MACHINE.

SPECIFICATION forming part of Letters Patent No. 577,740, dated February 23, 1897.

Application filed August 12, 1896. Serial No. 602,535. (No model.)

*To all whom it may concern:*

Be it known that I, THOMAS B. FULLER, of Durham, in the county of Durham, State of North Carolina, have invented certain new and useful Improvements in Bag-Stitching Machines, of which the following is a complete specification, reference being had to the accompanying drawings.

The object of my invention is to produce a machine adapted to stitch bags across the corners of their bottoms, so as to give to a completed and filled bag a regular rectangular shape with a flat base to stand upon or a curved or elliptical shape in cross-section, which a filled bag presents according to distance it is sewed from extreme end of corner.

In the tobacco trade particularly there is demand for the square or rectangularly shaped and oval bag, which it has been attempted heretofore to meet by the employment of hand-stitching, using, for example, the bags whose side seams or seam are produced by machines well known in the art of bag manufacture. The production of bags in that way, however, is not only slow, laborious, and expensive, but the manufacture is also attended with loss on account of the number of imperfect bags produced, it being necessary to sew straight parallel seams across the opposite corners of each bag and at a true angle to the side seams thereof. Apparently slight deviations of the seam from the correct line produce in practice such irregularities in the bag when finished as to necessitate its being rejected, or such defects may develop only when the bag is filled, and occasion not only the loss of the bag, but also the loss of time and labor required for filling the bag.

By my invention I have produced an automatic machine which, receiving a bag, preferably of the regular and accurate form in which it is made by side-seaming bag-machines, subjects it to a series of regular and mechanically-exact operations, whereby, having been creased precisely at right angles to its side seams and having been folded as to its bottom to produce a perfectly square cornered and true base, it is fed through the stitching-machines, which sew across its corners, as required. Each bag is subjected to precisely the same operations, and in addition to the security against loss gained by the employment of my machine a degree of uniformity in the manufacture is attained which it is impossible to attain in hand-made bags.

While I refer to my machine as especially applicable to the manufacture of tobacco-bags, its use is not limited thereto, but is applicable to the manufacture of bags generally, one of its features being a considerable adjustability of the parts, whereby bags of various sizes may be made upon one machine through the proper adjustment of its several elements.

In the accompanying drawings, Figure I is a front elevation, partly in section, of the complete machine, showing in full lines the parts in that which may called the "initial" position, or that position in which the bags to be cornered are supplied to the machine. In dotted lines is illustrated the second position of the parts, in which the bag-holding fingers have expanded the bag and hold it ready to be clamped by the clamping-jaws that are advancing toward it. Fig. II is a perspective view of the machine, showing the third position of the parts, in which the clamping-jaws have caught the bag, but before the bag-holding fingers have begun to close together within the bag. Fig. III is a horizontal section on the line A A of Fig. I, showing the parts in the position illustrated in Fig. II, the discharge mechanism being omitted. Fig. IV is a fragmental plan view of the clamping-jaws, bag-holding fingers, and their immediate supporting members, illustrating the relative positions of the jaws and fingers in the fourth position, in which the fingers are closed together and reversing and the jaws are approaching each other to crease the sides of the bag transversely to its seams. Fig. V is a view similar to Fig. IV, showing the fingers in the completely reversed and expanded positions and the two sets of the clamping-jaws at their nearest approach to each other immediately before they release the bag to permit its travel upon the fingers toward the machine-heads. Fig. VI is a central vertical longitudinal section of the machine, showing the position of the parts in which the bag, having been released from the clamping-jaws by which they are shown as held in Fig. V, is carried by the expanded fingers within it toward the machine-heads, the latter being shown in the depressed position which they occupy when ready to receive the bag. Fig. VII is a view similar to Fig. VI, showing the position of the parts in which the bag has been advanced by the expanded fingers between the machine feed-plates, but before the feed-plates have clasped it prior to its release by the fingers. Fig. VIII is a central longitudinal vertical section showing in full lines the parts in the position shown in Fig. I and showing in dotted lines the feed-plates clamping the bag, the fingers being closed together to release it. This figure also illustrates in dotted lines the thread-severing mechanism retiring. Fig. IX is a front elevation showing the parts in the position shown in Fig. VI. Fig. X is a side elevation, taken from the side opposite to that shown in Fig. II, showing the parts in the same relative position illustrated in that figure. Fig. XI is a horizontal section on the line B B of Fig. I. Fig. XII is a similar view on the line C C of Fig. I, portions being broken away. Fig. XIII is a perspective view of the bag-holding finger-head and its carriage, the latter being partially broken away. Fig. XIV is a vertical section on the line D D of Fig. XIII, with some of the parts omitted. Fig. XV is a perspective view on a slightly-reduced scale, showing one of the fingers and its carrier-block in juxtaposition. Fig. XVI is a horizontal section on the line E E of Fig. XIV. Fig. XVII is a similar view on the line F F of Fig. XIV. Fig. XVIII is a perspective view of one of the finger-levers, clearly shown in Fig. XIV detached. Fig. XIX is a perspective view of the clamping-head-carrying frame. Fig. XX is a section on the line G G, Fig. XIX. Fig. XXI is a perspective view of the machine-head-carrying frame detached. Fig. XXII is a sectional view on the line H H of Fig. XXI. Fig. XXIII is a vertical sectional view, on an enlarged scale, showing the feed-plates and their actuating mechanism. Fig. XXIV is a top plan view of the feed-plates and frame. Fig. XXV is a transverse section, partly in elevation, of the subject-matter of Fig. XXIII, showing the feed-plates in the closed position in full lines and in the open position in dotted lines. Fig. XXVI is a perspective view of the lower feed-plate and frame, with the upper feed-plate detached. Fig. XXVII is a perspective view of the upper feed-plate detached. Fig. XXVIII illustrates in group the main shaft of the machine, with all of its cams detached, the latter being shown in their order and in the relative positions which they occupy in Fig. I. Fig. XXIX is a side elevation of the shaft and its respective cams assembled, but with the last cam shown in Fig. XXVIII omitted. Fig. XXX is a bottom plan view of two of the cams as shown in Fig. XXIX. Fig. XXXI is a fragmental top plan view of the entire machine, with the parts in the position shown in Fig. I. Fig. XXXII is a similar view showing the parts in the position shown in Fig. VI. Fig. XXXIII is a similar view complete, showing the parts in the position illustrated in Fig. VII, with a few of the parts broken away. Fig. XXXIV is a transverse vertical section taken longitudinally through the machine-head frame and showing the parts in the position which they occupy in Fig. I. Fig. XXXV is a similar view showing the parts in the position which they occupy in Fig. IX, looking toward the rear of the machine. Fig. XXXVI is a transverse vertical section, taken through the clamping-head frame, showing the parts in the position shown in Fig. I, looking toward the front of the machine. Fig. XXXVII is a front elevation of the thread-severing and bag-discharging mechanism, with its track detached. Fig. XXXVIII is a horizontal section taken through the machine-heads immediately underneath the feed-plates. Fig. XXXIX illustrates in one group three different forms which the bag assumes in passing through the machine.

Referring to the figures on the drawings, 1 indicates each of the two frame side pieces of my machine, which are preferably castings of suitable weight and dimensions. They are united by cross-frame pieces 2 and 3, bolted between them in their lower parts, and by a bridge 4, secured, as by bolts 5, to flanges 6 upon their upper edges, respectively.

The parts above enumerated constitute a desirable form of solid rigid frame for the machine.

7 indicates the main shaft of my machine, that is revolubly supported in suitable boxes 8 in each of the cross-pieces. Parallel to the shaft 7 on the outside of the frame is a power-shaft 9, which is suitably supported in suitable boxes 10, carried in brackets 11, bolted, as indicated at 12, to the frame side piece exhibited in Fig. X. The power-shaft 9 carries, as a representative element of the means of applying power, a belt-pulley 13, keyed or otherwise secured to it. The shafts 7 and 9 are operatively united by a train of diminishing gear, of which 14 indicates a fixed pinion upon the shaft 9, that meshes with a gear 15 upon a stud 16, which gear is integral with or is secured to a pinion 17, that meshes with a gear 18, fixed upon the shaft 7. The shaft 7 carries a series of cams whose several offices will be hereinafter specified and explained in connection with the several groups of mechanisms which they actuate, but which may be here enumerated as component members of the shaft 7, to which they are severally fixed, and as being all illustrated in their several details in Figs. XXVIII to XXX, inclusive, of the drawings.

Upon the end of the shaft 7 adjacent to the belt-pulley 13 is the peripherally-grooved or channeled cam 21, which, on account of its size, is preferably composed of two disks keyed or otherwise secured to the shaft, and whose opposing flanges 22, of suitable contour, define between them the groove 23, of required shape, as illustrated.

Between the cross-pieces 2 and 3 the shaft 7 carries four cams, namely, two peripherally-grooved cams 25 and 26, whose respective cam-grooves 27 and 28 are relatively disposed, as shown in Figs. XXIX and XXX, respectively, and in subsequent order the disk cams 29 and 30.

Upon its extremity, opposite the cam 21, the shaft 7 carries upon the outside of the second cross-piece 3 four disk cams—to wit, 31, 32, 33, and 34.

Referring particularly to Figs. I and II, 35 indicates a clamping-head-carrying frame, for details of which see Fig. XIX. This frame is provided upon opposite sides with suitable vertical tracks, preferably the V-shaped tracks 36, which work in correspondingly-grooved ways 37, (see Fig. XI,) formed in guide-boxes 38, each box being adjustably secured within an oblong rectangular recess 39 in a frame side piece 1, as by means of a group of screw-bolts 40 in the boxes, and at right angles thereto a group of bolts 41, screwing into the wall of the frame-piece and abutting against the side of the guide-box. For details of the screws 40 and 41 reference may be had to Fig. XI.

For imparting the required vertical motion to the frame 35 I prefer to employ upon its lower end a V-shaped extension 45, through the lower extremity of which is secured a stud-bolt 46, that carries a roller 47. This roller 47 is located in the path of the cam 31, which serves through it to actuate the frame 35, as stated, the downward limit of movement of the frame being determined by the impingement of the adjustable stop-bolt 48 against the projecting corner 49 of the box 50 upon the frame side piece.

The frame 35 includes upwardly-projecting members 51, (shown in detail in Fig. XIX,) each of which is surmounted by a table 52. The upper face of each table is provided with a transverse dovetail groove 53, both grooves being in alinement one with the other. Each groove may, of course, be provided, as usual, with a spacing-block 54 and screws 55. Within the respective grooves 53 travel clamping-jaw carriages 56, which are preferably transversely coextensive with the tables, so as to give them accuracy and rigidity of movement across the faces thereof, respectively. Each carriage is provided with a projection 57, extending upwardly from it at right angles upon one side thereof. It is bored out to receive a bolt 58, that loosely carries a box 59, which travels with a rocking motion within a slot 60 of a cross-head 61. The shank 62 of the cross-head 61 is loosely secured to an angular lever extension 63 by suitable means, as, for example, a bolt 64, screwing into the shank 62 and passing through a slot 65 in the extension 63, the parts being held in accurate alinement, as by means of a tongue-and-groove connection 66, correlatively arranged in the opposite faces of the connected parts. (See Fig. XXXIV.) The extension 63 constitutes a continuation of the clamping-jaw-actuating lever 67, that is curved at its lower end 68 to receive a rock-shaft 69, the opposite ends of which are mounted in the box 50 and in a corresponding box 70, respectively. The levers 67 are designed to operate at predetermined intervals of time to actuate the clamping-block carriages, and I prefer for that purpose to unite them by coiled springs 72, that extend from one to the other through openings provided for them in the frame of the machine.

For imparting the requisite motion to the levers in opposition to the force of the springs 72 I employ lever-arms 73, extending toward each other from opposite rock-shafts 69, to which they are secured. The adjacent extremities of the two arms, respectively, are provided with stud-bolts 75, each of which carries an antifriction-roller 76. These rollers travel upon the face of the cam 29, whose contour (see Fig. XXVIII) controls their movements. The contour of the cam 29 serves, as appears from the illustration, to hold, through nearly half of each of its revolutions, the arms at a maximum distance from the shaft 7, which serves during the same time to hold the levers 67 outwardly against the tension of their springs.

The inward limit of movement of each of the arms 67 is fixed by set-screws 78, adjustably secured to the arms 67, respectively, and impinging against the sides of the frame.

The upper face of each of the carriages 56 is provided with a transverse dovetail channel or groove 79, within which work corresponding projections 80 of two blocks 81, whose office is to carry clamping-jaws 82, one of which projects upwardly from each of the blocks. The members of each pair of blocks are urged toward each other through the groove 70, as by a coiled spring 83, secured at its opposite ends to upwardly-projecting stud-pins 84, the movement of either member of each pair beyond a determinate line being prevented by a pin 85, extending upwardly from the face of the carriage between semicircular recesses 86, formed in the adjacent edges of the blocks which compose the pair.

As a preferable form of embodiment of clamping-jaw-separating mechanism adapted to actuate each pair of jaws against the force of its respective spring, I prefer to employ upon each carriage a horizontal plunger $86^a$, provided with a wedge-shaped end 87. Each plunger works reciprocally within a suitable box 88, provided for it upon the top of its carriage 56. Each pair of blocks 81 is provided with adjacent antifriction-rollers 90, whose line of juncture lies in the path of the plunger 86. Consequently when the plunger is pushed forward through its box 88 it wedges between the rollers 90 and forces the blocks with their respective clamping-jaws apart.

For actuating the plungers I employ levers 91, pivotally secured upon opposite sides of the frame, as upon stud-bolts 92, located near the base of each side frame-piece. The free end of each of the levers 91 is loosely connected to its respective plunger, for which purpose I prefer to provide each plunger with a bifurcated end 93 and within each bifurcated end an antifriction-roller 94. The bifurcated end of each plunger straddles the end of a lever 91, and its roller 94 works in a longitudinal slot 95 in the lever. I prefer to apply a constant force to drive each plunger between its pair of rollers 90, and for that purpose employ, in connection with each of the levers 91, a coiled spring 96, secured at one end to one of the frame side pieces and at the opposite end to a projecting arm 97 upon the lever 91. For positively actuating the levers 91 against the force of their respective springs 96 the mechanism which I prefer to employ consists of sliding rods 98, secured, as in boxes 99, upon the opposite frame side pieces.

The sliding rods 98 are secured to their respective levers 91 by loose connections, as, for example, links 100, and carry upon their inner extremities, respectively, antifriction-rollers 101, which work, respectively, against the peripheries of the cams 32 and 33, which, as above specified, are secured to the shaft 7. The cams 32 and 33, although they may be substantially of similar contour, are preferably so disposed upon the shaft 7 as to actuate one of the levers 91 a little in advance of the other, the purpose of which will hereinafter more clearly appear from the description of the operation and relation of the several parts.

102 indicates a vertically-reciprocatory plunger carried in suitable guide-boxes 103, (see Fig. XIX,) which may be formed in the front wall of the carrier 35 and completed by overlapping plates 104, secured in place, as by screw-bolts 105. The plunger is adjustably secured to a bifurcated tailpiece 106, and for the purpose of the necessary adjustment is preferably fastened in place by a bolt 107, which, passing through a longitudinal slot 108, enters the plunger 102. A second screw 107$^a$, screwing into a projection 111 on the face of the plunger, serves to fix the relative adjustment of the parts as often as required. The two legs 112 of the tailpiece straddle the shaft 7 between the cams 33 and 34, and thereby holds the tailpiece in vertical alinement with the plunger and with the shaft 7. Upon the stud-bolt 113 the tailpiece carries an antifriction-roller 114, which works against the face of the cam 34 and derives from it at proper intervals of time the vertically-reciprocatory movement which it imparts to the plunger 102, to which it is, in the manner above described, secured. The legs may be united by a cross-piece and spring-actuated bearing-head 115, but the employment of the two elements last named is entirely unessential.

In connection with the carriages 56, respectively, I provide bag-separating mechanism designed to cut at the proper time the chain-stitches formed by the side-seaming machine, which link the bags together. These stitches serve to assemble the bags in a convenient manner, so that the mouths of each one of them opens in the same direction and affords means for guiding the operator in selecting the side of the bag to be presented to the bag-holding fingers, as hereinafter set forth. It is therefore desirable not to sever the chain until after the bag is in place.

A simple form of bag-separating mechanism is illustrated clearly in Fig. XXXVI, in which rods 115$^a$, respectively, work transversely through suitable bearings in the respective carriages 56 in the path of the lever 67, which, striking them when they advance to force the clamping-jaws together, pushes them, respectively, through the carriages until their cutting ends 115$^b$ come opposite to the clamping-heads, in which position the operator drawing the chain-thread against their cutting edges severs them. The rods 115$^a$ are held irrevolubly within their respective bearings, as by pins 115$^c$, working in loops 115$^d$, secured to the outer end of the tables 52, respectively.

Upon its upper end the plunger 102 carries an actuating-bar 116, that projects toward the interior of the body of the machine. It is supported rigidly in the horizontal position, as by a brace 117, that is secured to it at its upper end and to the plunger 102 at its lower end, at which end it works in a slot 118 in the carrier 35. The office of the plunger 102 is to operate the bag-holding fingers, and those being carried upon a traveling head the actuating-bar 116, which constitutes a rectangular extension of the plunger, is employed to actuate the fingers in any required position. Each of the frame side pieces 1 is provided upon its upper part, adjacent to the carrier 35, with oppositely internally-projecting ledges 120, each of which upon its lower edge is provided with a rabbet 121, defined upon the bottom of the ledge by a downwardly-projecting flange 122.

Within the rabbets 121, respectively, are guideways 123, adjustably secured, as by bolts 124, passing through the ledges 120 and screwing into the guideways, in connection with abutment screw-bolts 125, screwing through the flange 122 against the guideways. The guideways are respectively provided with oppositely-opening grooves 126, each of which is preferably V-shaped in cross-section. (See Fig. IX.)

Within the grooves 126 between the guideways 123 works a horizontally-reciprocatory finger-head carriage 127, having upon its opposite sides inversely-V-shaped edges to fit the grooves 126.

To impart to the carriage 127 reciprocatory motion at required intervals of time, I prefer to employ a lever driven by a cam upon the shaft 7. 130 indicates such a lever that is pivotally supported, as indicated at 131, upon the lower part of one of the side frame-pieces 1. At its upper end it is pivotally united, as indicated at 132, to a bar 133, that is rendered longitudinally adjustable by means of an ordinary turnbuckle 134. The bar 133 is pivotally connected, as indicated at 135, to the carriage 127, as by means of a lug 136, cast integrally therewith.

The pivotal support 131 for the lever 130, illustrated as a bolt, and the connection between the lever and the side frame-piece through the bolt are so adjusted as to bring the lever within operative distance of the cam 26. At the proper position for operation the lever is provided with a bolt 137, that carries an antifriction-roller 138, which works in the groove 28 of the cam 26, and derives from the shape of the groove the motion which it is designed to impart to the carriage 127.

The carriage 127 moves in vertical alinement above the actuating-bar 116 and carries the finger-head, the details of which are illustrated in Figs. XIII to XVIII, inclusive, of the drawings. As will appear by reference especially to these figures, the finger-head consists of a metallic casting embodying a cylindrical neck 140, a disk-shaped head 141, of greater diameter than the neck, and a reduced cylindrical end 142, defined by an angular shoulder 143. The neck 140 works in a bearing 144, provided for it in the carriage 127. (See, for example, Fig. VIII.) When the neck is set in its bearing 144, the disk-head 141 rests against the top of the carriage. Underneath the carriage is fitted to the reduced end 142 and the lower part of the neck a collar 145, that is secured in place as by means of a spline 146 and set-screw 147. The collar carries a flange 148, that is cut away on one side to form a radial recess 149. (See Fig. XIII.)

In order to render the movement of the finger-head steady and regular, I prefer to provide upon the bottom of the carriage 127 lugs $a$, within the apertures of which works a guide-rod $b$, provided upon its forward end with a brake-shoe $c$, that is impelled against the collar 145, as by a coiled spring $d$.

In the neck 140 is formed a narrow vertically-elongated recess 150, within which is located a block 151, whose shank 152 (see Fig. XIV) extends through a contracted aperture or throat 153 into a relatively enlarged bore 154, formed concentrically within the cylinder 142. The shank 152 terminates in a head 155, which is of nearly equal diameter with the bore 154, within which it extends a short distance, but beyond which it mainly projects, as shown in Fig. XIV, for example. Within the bore 154 a coiled spring 156 surrounds the shank 152, and seated at one end against the head 155 and at the other against the wall 157, which defines the throat 153, tends to retain the block 151 in the bottom of the recess 150. Upon the opposite sides of the block 151, between it and the opposite walls of the recess 150, respectively, are snugly fitted bell-crank levers 158. (See Fig. XVI.) Each of the levers 158 is independently pivoted, as by means of a countersunk screw 159, to the inner walls of the neck 140, and the short arm of each lever is independently and loosely pivoted to the block 151, for example, by means of a pin 161, entering a recess 162 in the end of the block. The levers 158 face in opposite directions, so that when actuated by the impulse of the spring 156, through their connections with the block 151, their long arms 163 are separated from each other, as appears in Fig. XIV.

In the face of the disk head 141 is formed in alinement with the levers 158, respectively, two parallel grooves or channels 165 and 166, which communicate, respectively, through the body of the head 141 with the recess 150, as illustrated in Fig. XIV. The long arms 163 extend into their respective grooves 165 and 166 and terminate in round heads 167, which, through the upward movement of the block 151, travel toward and from each other within said grooves.

The grooves 165 and 166 are separated by a vertical wall 168, in the opposite sides of which are formed overhanging ledges 169. In the same plane with the ledges 169 are secured upon the face of the disk head 141, as by screws 170, side plates 171, which, extending beyond the edges of the grooves 165 and 166, respectively, form upon the outer sides of said grooves overhanging ledges 172, that correspond and coöperate with the ledges 169, respectively, defining above the respective grooves 165 and 166 contracted slots 173 and 174, respectively.

Within each of the grooves 165 and 166 works one of a pair of reciprocatory finger-blocks 175, whose flanged base 176 extends underneath the ledges 169 and 172 and holds it in place. A strip 177 upon one side of each of the blocks affords a guide for a plate 178, that is fastened, as by screws 179, to the block. Each of the plates 178 carries upon its outer extremity a vertical bag-holding finger 180. Each of the blocks 175 is provided with a vertical slot 181, the head 167 of one of the levers 158 working in one of said slots and the head of the other lever working in the other slot.

From the foregoing description it is apparent that whenever the block 151 is elevated the long arms 163 of the levers 158 are forced toward each other. Consequently at such time the fingers 180, which are carried upon the plates 178, that work face to face, as illustrated in Fig. XIII, will be brought close together, and when under the impulse of the spring 156 against the head 155 the block is forced to the bottom of the recess 150 the fingers will be forced to the outward limit of their respective movements.

As above set forth, the carriage 127 carries the head 155 in vertical alinement with the actuating-bar 116, which is raised and lowered by the movement of the plunger 102, wherefore it appears that as often as the plunger and its actuating-bar 116 are elevated against the head 155 it will operate to close the fingers 180 in proportion to its degree of elevation, and that whenever it is lowered out of engagement with the head 155 the fingers 180 separate under the impulse of the spring 156.

In addition to the mechanism for operating the bag-holding fingers to and from each other in the manner just described I prefer to employ, for a purpose which will hereinafter more fully appear, mechanism for partially rotating the finger-head through a quarter of a revolution, which, for the want of a better term, I denominate "finger-reversing" mechanism.

The present preferred embodiment of that mechanism includes a vertically-disposed reciprocatory pin-carriage 182, that is provided upon its opposite edges with tracks 183, inversely V-shaped in cross-section, which travel in V-shaped grooves 184 in guideways 185 and 186, that are supported, preferably, in the manner illustrated. (Compare Figs. XXXIV and XXXVI.)

As illustrated, the flange 122, above referred to, adjacent to the carriage 182, is extended downwardly until it meets a projection 187, extending from and preferably like the flange 122, constituting a portion of the casting of the frame side piece. The projection 187 extends underneath the guideway 185 in the form of a flange. The guideway 186 is secured to the flange 122 by screw-bolts 188, and the guideway 185 is screwed to the plate in like manner by bolts 189 and is adjustable by means of abutment-screws 190, screwing through the flange upon the projection 187. The pin-carriage is provided with a lug 191, from which projects vertically a cylindrical horizontally-adjustable pin 192, which works in the recess 149 upon the flange 148 of the finger-head.

Although the finger-head carriage 127 and the pin-carriage 182 travel substantially at the same time and with equal speed through certain portions of their respective movements, yet they are also timed differently through other portions of their respective movements. Consequently I provide independent pin-carriage-actuating mechanism, which consists, as illustrated, of a lever 193, pivotally supported at its lower end, as by a bolt 194, to the frame side piece 1 opposite to that which carries the lever 130. It is pivotally united at its upper end 195 with a connecting-bar 196, which is pivoted, as indicated at 197, to the pin-carriage 182. A turnbuckle supplies means for regulating the length of the bar 196, as required.

The lever 193 is carried by its bolt 194 in operative relations with the cam 25, and is at the proper point provided with a bolt or screw-stud 199, that carries an antifriction-roller 200, which works in the groove 27 of the cam 25. The rotation of the shaft 7 communicates through the cam 25 and lever 193 the requisite motion to the pin-carriage 182. The relative shapes and adjustments of the cams 25 and 26 effect the desired relationship of the respective movements of the carriages 127 and 182.

In Figs. XXI and XXII is illustrated in detail the machine head-frame 201, which includes a body part that serves to rigidly unite side pieces 202, that are provided upon their opposite outer edges with tracks 203, preferably inversely V-shaped in cross-section, as clearly illustrated in Fig. XXII. The machine-head frame works between vertical guideways 205, that are carried on flanges 206, which project internally from the respective frame side pieces 1. The guideways are fastened to the inner respective flanges by screw-bolts 207, which pass through them and screw into the flanges. (See Fig. XI.) Abutment-screws 208, screwing through the walls of the side frame-pieces against the guideways, respectively, are also provided for the purposes of adjustment and of taking up wear, as usual.

The machine-head frame is made vertically movable, as a preferable adaptation of means for removing at the proper time a bag from the bag-holding fingers, as will hereinafter in the description of the operation of the machine more fully appear. In order to impart to the said frame the necessary vertical motion, and at proper intervals of time, I provide in the wall of one frame side piece an aperture 210, through which projects a rocking lever 211, that is carried upon a shaft 212, supported in suitable lugs 213, projecting outwardly from the frame side piece. One arm of the lever 211 extends toward the interior of the frame and is pivotally connected, as indicated at 214, with a link 215, that is pivotally secured, as by a bolt 216, to the body part of the machine-head frame 201, said bolt entering a hole 217, provided for it therein. The short arm of the lever 211 is pivotally connected, as indicated at 218, to an extensible connecting-bar 219, provided with the usual turnbuckle. The bar 219 is pivotally connected, as indicated at 220, to a rock-lever 221, that is loosely mounted, as by means of a sleeve 222, upon the rock-shaft 69.

Upon its inner extremity the lever 221 carries upon a bolt 223 an antifriction-roller 224, that rides against the periphery of the cam 30, which actuates the lever and its several connections, to impart through it to the machine-head frame the required vertical movement indicated by the shape of the cam 30, as shown in Figs. XXVIII and XXIX.

The side pieces 202 of the machine-head frame are surmounted by tables 225 and 226, which carry, respectively, suitable right and left sewing-machine heads 227 and 228. Any preferred form of machine-heads adapted for the purpose may be employed. The kind illustrated are of the well-known Willcox & Gibbs variety, with Grover & Baker double-thread attachment, both of which, being of well-known construction, do not require detail description, except as to those features whose novelty constitutes part of the present invention.

Each of the machine-heads is provided with a shaft 229 and 230, respectively, to the outer ends of which respectively are secured driving-pinions 231 and 232. To the table 226 is secured, as by screw-bolts 233, an upright hanger 234, and to the table 225 is secured, as by bolts 235, a journal-supporting piece 236. The hanger 234 is provided upon its upper extremity with a journal-box 237, while a projecting arm 238 on the support 236 carries a second journal-box 239 in horizontal alinement with the box 237. (See Fig. XXXIII.) Within the journal-boxes 239 and 237 is mounted a rotary shaft 240. The shaft 240, near its opposite extremities, carries fixed gears 241 and 242, which intermesh, respectively, with the pinions 231 and 232. The shaft 240, being designed to be intermittently rotatory, is provided with a loose pinion 245, that meshes with a gear 246, secured upon one end of a shaft 247, carried in journal-boxes 248 in the journal-support 236. (Clearly shown in Fig. XXXIII.) Upon its opposite extremity the shaft 247 carries a beveled gear 248$^a$, that meshes with a similar gear 249 upon a vertical shaft 250, that is carried in a journal-box 251 upon the journal-support 236 in a box 252 in a support 253, projecting from and secured to the outer wall of a frame side piece, and in a lower journal-box 254 in a support 255, secured in like manner to the wall of the frame side piece near its base.

To accommodate the vertical movement of the machine-head frame, the gear 249 is designed to permit the longitudinal movement through it of the shaft 250, from which it derives the rotary movement. For this purpose it is provided on its under side with a collar 256, having an annular groove 257.

258 indicates an angular retaining-piece secured, as by screws 259, to a flattened face 260 upon the journal-box 251, the horizontal retaining end 261 of which partially encircles the collar 256, working in its groove 257. By this means the gear 249 is revolubly fixed to the box 251. The shaft 250 is provided with a longitudinal groove 261$^a$, within which works a feather 262, inserted in the gear 249. A collar 263, secured to the shaft above the box 252, supports the shaft 250 in place.

Upon the shaft 250, near its lower end, is secured a beveled gear 264, that meshes with a corresponding gear 265, secured to the extremity of the shaft 9, from which it derives the motion that it communicates to the machines from the belt-pulley 13.

With the loose pinion 245 (see Figs. XXXI to XXXIII) is incorporated a clutch member 266, against which works a second clutch member 267, splined to the shaft 240. It is, as usual in ordinary clutch mechanism, provided with an annular groove 268, which receives pins or antifriction-rollers 269, carried opposite to each other upon arms 270 of a bifurcated clutch-lever 271. The clutch-lever is pivoted as between jaws 272 of a standard 273. Upon the side of the jaws opposite its bifurcated end the clutch-lever is extended toward a cam-standard 274 and enters the cam-groove 275 in the same. The groove 275 is shaped so as to compel engagement of the clutch members during the operative period of the machines, that is to say, during the elevation of the machine-head frame, and to compel separation of the clutch members during the period that the machines are designed to be at rest, that is to say, when the machine-head frame is in its lowest position. (See Fig. XXXIV.)

Each of the machine-heads is provided with an angular feed-mechanism-supporting frame 276, which is preferably cast integrally with the machine-head proper and surmounts a solid bearing-piece 277, within which, at one end, respectively, are journaled the respective shafts 229 and 230. The shaft of one of the machines, as illustrated the shaft 229, has its forward end extending beyond the supporting-piece 276 and carries an eccentric 278, which engages with the walls of a suitable recess 279 in a feed-bar 280. (See Fig. XXV.) The forward end of the feed-bar is slotted, as indicated at 281, to receive a horizontally-projecting pin 282, secured to the face of the support 276. The forward end of the bar is held in engagement with the eccentric by means of a retaining-plate 283, and from the eccentric 278 the bar receives forward and backward oscillatory motion.

284 (see Fig. XXXVIII) indicates a recess in the bar 280, within which is located, between the bar and the face of the support 276, a spring-actuated dog 285, that is pivoted, as indicated at 286, to the bar. 287 indicates its actuating-spring.

288 indicates a second spring-actuated dog located in advance of the dog 285 and pivoted, as indicated at 289, to the face of the supporting-piece 276.

290 indicates rabbeted guide-plates secured, as by screws 291, to the upper face of the angular supporting-piece 276. The rabbets 293 define guideways for bottom or lower feed-plates 295, that are separated to form a medial slot 296 between their entire lengths, and are united by a feed-plate frame 297, the sides of which are joined together, as by bridges or arches 298. Each of the two lower feed-plates is provided with a longitudinal slot 299 for the accommodation of the respective needles while the machines are in operation, and the lengths of the slots are determined by the distances which these plates are intended to travel, or, in other words, the time of the operation of the machine and the length of stitches it has to make.

Upon the bottom of one of the lower feed-plates is firmly secured a rack-bar 301, with the teeth of which the dogs 285 and 288 engage, after the manner of well-known feed mechanism, to prevent the backward movement of the feed-plate and to advance it step by step through the forward and backward oscillatory movement imparted to the feed-bar, as above set forth. The dogs are adapted to be released when the machines are depressed by meeting an arm 300, projecting upwardly from the bridge 4.

Upon the top of the lower feed-plate and adapted to lie flat against its upper surface, underneath the arches 298, is an upper feed-plate 302, which is provided with needle-slots 303, that are coextensive and in alinement with the needle-slots 299 in the plates 295.

Between the bridges 298 the upper feed-plate 302 is provided with outwardly-extending lateral flanges 304, that are raised above the level of the plate 302, as by vertical walls 305.

The forward end of the upper feed-plate is provided with a tapered folding or creasing plate 306, whose point 307 is curved upwardly, so that it may crease or press the bag in the proper form without danger of catching or tearing it.

The flanges 304 (see Fig. XXV) work in opposite longitudinal kerfs 308 in lifting-bars 309, that are supported above and out of contact with, but parallel to, the guide-plates 290 by spacing-blocks 310, surrounding stud-pins 311, that are secured to the plates 290 either directly or by being passed through holes in the same and screwed into the upper face of the supporting-piece 276, as preferred. Each of the pins 311 is screw-threaded at its upper extremity and carries a nut 312, between which and the top of the lifting-bar 309 is provided around each pin a coiled spring 313, which depresses the lifting-bar normally against its spacing-blocks 310. Inasmuch as the lower feed-plates 295 are carried by the fixed guide-plates 290, and the upper plate is secured by its flanges 304 to the lifting-bars, it will be perceived that the action of the springs 313 tends to keep the opposing faces of the two feed-plates in close contact, in which position they are designed to hold a previously-inserted bag for feeding it to the machines.

In order to provide for the insertion of a creased bag to the machines from time to time, as required, the plates are intermittently actuated by separating mechanism, which permits the introduction of a bag to be sewed. In the simple form of embodiment adopted in the present preferred form of the machine such separating mechanism consists of vertical rods 315, secured, respectively, at their upper ends, as indicated at 316, to the lifting-bars and working in bearings 317, (see Fig. XXV,) respectively provided for them in the supporting-pieces of the machine-head. A separate cross-arm 318 unites each of the rods 315 with a depending rod 319, each of which projects a suitable distance below the bottom of the machine-heads, respectively. Each of the ledges is provided with an obliquely-disposed bracket 320, which is adjustably secured, as by means of a slot-and-bolt connection 321. Upon their upwardly-projecting ends the brackets respectively carry vertically-adjustable stop-pins 321$^a$, which, for the purpose of adjustment, preferably consist of screw-bolts. These stop-pins are, in practice, adjusted to aline with the rods 319, respectively, so that each time the frame 201 travels toward its lower limit of movement the stop-pins impinge against the bars 319 and through them, in the manner described, elevate the lifting-bars, thereby, at the times when the creased bags are to be fed to the machine, separating the feed-plates to receive them. Each of the shafts 229 230 is provided with an eccentric 322, around which a split cam-collar 323 is operatively secured, as by means of a bolt and nut 324. Each cam-collar is pivotally connected, as indicated at 326, to a link 327, which is likewise pivotally connected to a stud-frame 328, firmly secured to a vibratory bar 329. One end of each bar is pivoted, as indicated at 330, to one of two bracket-supports 331, secured at its lower end to one of the tables 225 226. The opposite end of each vibratory bar is bent, as indicated at 333, to reach a reciprocatory rack-bar 334, to which it is loosely pivoted, as by means of a screw 335, passing through a longitudinal slot 336 in the end of the vibratory bar. The rack-bar works in suitable bearings 337 in a bar-support 338, hung, as indicated at 339, from the supporting-frame 276. From the vibratory bar the rack derives reciprocatory motion. Each bar meshes with one of two pinions 340, each secured to one of two shafts 341, carried in vertical bearings 342, formed in studs 343, two of which project, respectively, in opposite directions from the rack-bar support 338. Each of the shafts 341 carries, for example, upon its upper end a rotary shuttle 344 of suitable pattern and adapted to coöperate in the usual manner with the needle-bars 345 of the respective machines.

For holding the bags after they are sewed across the corners and before they are entirely released from the feed-plates I provide intermediate bag-holding mechanism. In the simple and efficient form of embodiment illustrated (see Figs. XXXIII and XXXVIII) the rear edges of the tables 225 and 226 respectively sustain plunger-bar supports 346, to the square apertures in which are fitted square plunger-bars 348, one pair of supports being provided for each plunger-bar, so as to render them movable to and from each other in accurate alinement. Each plunger-bar is surrounded between its supports with a coiled spring 349, which is set at one end against the inner bar-support and at the other end against a collar 350, secured to the plunger-bar. The tendency of the two coiled springs is to keep the plunger-bars asunder, the limit to the separating influence being imposed by the respective collars 350. Upon their opposing ends the plunger-bars are provided with vertical extensions 351, each of which carries a fixed jaw-plate 352, and pivoted thereto, as indicated at 353, a movable jaw-plate 354. The fixed and movable jaw-plates are held, respectively, normally in alinement by weak springs 355, which suffice to hold the weight of a bag delivered to them, but readily release it when required. The plunger-bars, as above specified, normally hold the jaw-plates out of contact, their office being to take a sewed bag each time the feed-plates are required to make their backward travel. They are called upon to perform that function each time the frame 201 travels downwardly to receive a new bag, as above set forth. I therefore provide upon each frame side piece 1 a vertical adjustable lug 356, which may be secured, as by a bolt 357, to a continuation 358 of the flange 206. (See Fig. X.) The upper extremity of each of said lugs is provided with an inclined face 360, which, working against the rounded ends 361 of the respective plunger-bars 348, serves to force them together and by the aid of their vertical faces 362 to hold them united during the required interval of time.

The bridge 4 is provided upon its upper surface with guide-pieces 363, screwed, for example, as indicated at 364, to its face and projecting a short distance beyond the rear of the bridge. The guide-pieces are provided with opposite guide-channels 365, respectively, which open opposite to each other and receive the flanges 366 of an arched frame-piece 367. This frame-piece carries the chain-stitch-cutting mechanism, bag-discharging mechanism, and feed-plate-returning mechanism. The operation of each of said mechanisms being dependent upon the movements of the frame 367, it is in order first to explain the manner in which it is operated. A link 368, pivoted between lugs 369 on the tail of the frame 367, is pivotally united, as indicated at 370, to a bent lever 371, the vertical portion 372 of which is adjustably secured, as indicated at 373, to a rocking lever 374, that is carried, as by a bolt 375, in a bracket-supporting arm 376, bolted to one of the frame side pieces 1. The rocking lever 374 carries an antifriction-roller 377, which may be mounted upon a bolt 378 and which works in the groove 23 of the cam 21. The shape of the groove controls, through the mechanism described, the movement of the arched frame 367, timing it so that it will perform its functions at required intervals.

The frame 367 is provided with a medial rib 380, in which is formed a longitudinal, preferably angular, channel which carries a driving-rod 381, that is secured in place, as by a plate 382, screwed to the under side of the frame 367 and spanning the channel. Behind the driving-rod within the channel is secured an actuating-spring 383, which yieldingly impels the driving-rod toward the front of the frame 367, its movement in both directions being limited by a screw 384, which enters it through a longitudinal slot 385 in the plate 382.

The movement of the frame 367 is timed so as to approach the machine-heads when they have completed their sewing operation and the frame 201 is descending to receive a fresh bag. In consequence of the completion of the sewing operation the feed-plates 295 302 at such time will have been fed to the rearward limit of their movement. When the rearward arch 298 of the feed-plate frame and the driving-rod 381 come into alinement through the downward movement of the frame 201, the frame 367 drives the rod 381 against the said arch 298, and with a yielding but steady movement forces the feed-plates back to their starting position. Before the feed-plates have been restored to their starting position the jaw-plates 353 and 354 have been actuated by their respective lugs 356 to receive the sewed bag and prevent its return with the plates. The next step in the operation of the machine, therefore, is to sever the chain of thread which unites the bottom of the bag to that of the next adjacent one, the feed-plates being adapted to carry two completely-sewed bags before one is released and delivered to the mechanism for finally discharging the severed bag. For that purpose I provide in the opposite side walls of the frame 367, respectively, bearing-apertures 387, and in alinement therewith, as in pendent supports 388, corresponding bearings 389. Within these bearings, in alinement one with the other, I provide reciprocatory rods 390, and near the outer extremity of each, upon the outside of the frame 367, a vertical pin 391, which preferably projects through both sides of its rod. The upper ends 392 of the pins extend above the surfaces of the frame 367 and are united by a coiled spring 393, whose unrestrained impulse is to cause the inner ends of the rods to abut one against the other within the interior of the frame 367, their line of juncture being in alinement in practice with the jaw-plates 353 354. Upon the surfaces of the guide-pieces 363, respectively, I provide movable wing-cams 394, pivotally secured, as by screws 395, and actuated toward the frame 367, as by springs 396, their inward movements, respectively, being limited by stop-pins 397, projecting upwardly in their path from the guide-pieces 363.

The lower extension 398 of each pin 391 carries an antifriction-roller 399, which through the movement of the frame 367 travel in the path of the cams 394. As they approach the inclined ends of the cams they travel up their divergent faces and are by a wedging action caused to move in opposite directions against the tension of the spring 393. This action takes place during the time that the feed-plates are being returned in the manner above described to their starting position. When the feed-plates have been completely returned, the rollers 399 clear the cams 394 and the spring 393 promptly acts to force the rods 390 together against the bag presented by the jaw-plates 354, holding it with sufficient tenacity to withdraw it from between the jaw-plates and to support it during the backward movement of the frame 367. Substantially at the same time that the rods operate to receive the bag the chain-stitch-severing mechanism should operate, for which purpose I prefer to connect it immediately with the rods 390 in the following manner:

In suitable groove-bearings 400, secured upon opposite sides of the frame 367, are mounted cutter-carriages 401, to each of which is secured a fixed shear-blade 402 and against which is pivoted, as indicated at 403, a movable shear-blade 404, the blades being held normally expanded, as by coiled springs 405, carried, respectively, between the arms 406 and 407 of the blades upon pins 408. Each of the arms 407 through the reciprocation of the respective carriages 401 moves under a horizontally-projecting stud 409, secured to the frame 367, each being provided with an antifriction-roller 410. Each of the carriages is, as by a connecting-piece 411, secured to the rods 390, respectively.

From the foregoing description it will be perceived that each time the rods 390 are actuated by the spring 393, after clearing the cams 394, they force the shears toward each other across the chain-thread. In their advance toward each other the arms 407 are actuated, respectively, by the stud 409, so as to operate each pair of shear-blades and sever the chain-thread presented to them, the action of the chain-severing mechanism and bag-discharging mechanism being simultaneous and of momentary duration. The frame 367 immediately upon completion of those respective operations begins under the impulse of the lever 371 its backward travel, in which the antifriction-rollers 399 force the cams 394 apart against the resistance of their springs 396, and consequently without disturbing their hold upon the bag which the rods 390 are carrying. As the frame 367 approaches the rearward extension of the guide-pieces 363 the rollers 399 meet the cams 412, securely fixed, as by screws 413, to the face of the guide-pieces. The cams 412 in manner similar to the operation of the cams 394 again separate the rods 390 and drop the bag. A discharge-chute 414 or an ordinary endless conveying-belt (not illustrated) secured to or working against the rearwardly-inclined face 415 of the machine receives each bag as it is dropped and discharges it clear of the cam 21 and projecting end of the shaft 7 into such receptacle as may be provided for it.

I shall now proceed to give a description of the operation of my machine, in which as the different parts and their respective relations are pointed out the several groups of mechanisms which coöperate to produce distinct results will be classified and named in accordance with their relations.

The division of the elements into groups is made for the special purpose of classifying the various elements of the machine, with the object of more briefly enumerating them in the appended claims.

The starting position of the mechanism is taken to be that shown in Fig. I of the drawings, the distinctive feature of that position as a starting position being that the fingers 180 are brought together with their flat sides presented to the operator, who, in that position, places upon them a previously side-stitched and hemmed bag. The fingers 180, with the elements which support them, compose the group of elements which are hereinafter denominated as "bag-receiving mechanism."

As hereinbefore stated, the bags which I prefer to employ are made by well-known bag-machines and are linked together by the side chains, in which relations they are presented to the bag-receiving mechanism. It is assumed, of course, that when the bags are placed upon the fingers 180 the machine is in operation and that only the bag-receiving mechanism is momentarily at rest for the reception of a bag. The further movement of the shaft 7 in the operation of the machine causes the cam 34 to revolve, which, operating against the roller 114, allows it to descend from the position shown in Fig. I upon the cam to that shown in Fig. II. In that position it permits the plunger 102 to descend, carrying with it the bar 116. Upon the descent of the bar 116 the head 155 of the shank 152 is driven downwardly by the spring 156 and the block 151 is depressed to the bottom of the recess 150, which operation, as is clearly shown in Figs. XIII and XIV, causes the fingers 180 to expand toward the side seams of the bag previously placed upon them, thereby stretching it taut between them and holding it firmly in position. The fingers, with mechanism for causing them to operate in opposite directions, compose the group hereinafter denominated "bag-expanding mechanism." By reference to Fig. XXVIII the relative positions of the cams 34 and 29 may be clearly apprehended. The cam 29, as hereinbefore set forth, actuates through the rock-shaft 69 the levers 67 and causes them to advance the clamping-jaws 82 toward the edges of the bag projecting outwardly beyond the side seams and presented to them by the fingers 180, that are expanded against the inner sides of the seams. As the clamping-jaws 82 approach the edges of the bag they are expanded by their respective plungers 86ª, separated by their levers 91, which are actuated by their springs 96, the springs being permitted to operate through the movement of the cams 32 and 33 with the shaft 7. The jaws 82 advance until they have fairly received both edges of the bags, whereupon the plungers 86ª retire, and the jaws, under the impulse of their springs 83, close firmly and tenaciously together against the respective edges of the bag.

By reason of the sequential order of movement of the levers 91, above referred to, one pair of jaws 82 advances and firmly clamps its edge of the bag before the other pair takes hold, thereby insuring certainty of engagement of each pair with its edge of the bag.

The clamping-jaws, their supports, and actuating mechanism are hereinafter designated as "bag-holding mechanism."

At the same time that the clamping-jaws take hold upon the edges of the bag the knives of the side-chain-severing mechanism, or the mechanism for severing the chain-threads which unite the side seams of the bag, present themselves, and in operating the simple form of mechanism illustrated the operator severs the side chains which unite the bag upon the fingers 180 from the next one to which it is linked by simply drawing the chain-threads against the knives. Thereupon, through the continued rotation of the shaft 7, the cam 34 again lifts the plunger 102, thereby forcing the actuating-bar 116 against the head 155 of the shank 152, and, raising the block 151, causes the fingers 180 to close again within the bag, which is supported by the clamping-jaws 82. When the fingers have just closed, the jaws 82, actuated by their levers 67, through the mechanism already described, make a still further approach toward each other, thereby releasing their tension upon the sides of the bag, but still firmly holding it between them. As the tension upon the side walls of the bag is relieved, so as to give room for the rotary movement of the fingers within it, the finger-head, actuated by the engagement of the pin 192 with the walls of the recess 149 of the flange 148, begins to revolve, the fingers 180 still remaining closed. The rotation of the finger-head, which is produced by the movements of the finger-head carriage 127, derived from the lever 130, actuated by the cam 26 upon the shaft 7, and of the pin-carriage 182, derived from the lever 193, actuated by the cam 25 upon the shaft 7, continues until the finger-head has made a full quarter-revolution and the fingers are in that position which I call the "reverse" position—that is to say, when they assume a position at right angles to the position shown in Fig. I. In that position the force opposed by the bar 116 against the spring 156 being again relieved through the further movement of the shaft 7, the fingers 180 again expand within the bag, stretching and creasing it at right angles to the position in which they first held it, that is to say, transversely to its side seams.

The finger-head-actuating mechanism and the finger-expanding mechanism in the connection last hereinbefore specified constitute side-creasing mechanism.

As soon as the fingers 180 reach the reverse position and before they expand, as was anticipated in the description immediately hereinbefore preceding, the respective pairs of jaws 82, actuated by the levers 67 through the movement of the cam 29, advance toward the fingers which have been reversed, as explained, within the bag, approaching so as nearly, but not altogether, to touch them. Immediately before such movement, however, the frame 35 is, through the operation of the cam 31, (see Figs. VI and XXVIII,) abruptly elevated a small distance, while the finger-head and fingers of course remain vertically stationary. Consequently the jaws 82, carried upon the tables 52, holding the bag between them, lift the bag up on the fingers 180. The frame 35, with its actuating mechanism, and the jaws 82 constitute, therefore, bag-lifting mechanism. The object of the employment of bag-lifting mechanism in this connection is to prepare the bottom of the bag to be folded into the square shape in which it is designed to be presented to the sewing-machine heads. When the bag is originally slipped over the ends of the fingers 180, its bottom is forced against the ends of the fingers. The bag-lifting mechanism is designed, therefore, to accurately adjust the relations of the fingers to the bag, which it would be impracticable for the operator to do in feeding the bag in the first place to the machine. When the reversed fingers 180 have received the bag after the operation of the bag-lifting mechanism, the plungers 86ª, operated by their levers and springs through the rotation of their cams, again advance to release the bag from the clamping-jaws 82, which, through the movement of the shaft 7 and the connecting mechanism which unites the jaws therewith, recede to the position from which they first started. When the finger-head has, in the manner above described, reached the reversed position, the carriage 127 is substantially at the limit of its outward movement, and upon the release of the bag from the clamping-jaws 82 begins, under the impulse of its lever 130, to travel in the opposite direction toward the machine-heads, carrying with it the bag upon the fingers 180 in the reversed position described and shown in Fig. VI. In this return movement the carriage 127, with its actuating mechanism, and the bag-supporting fingers constitute bag-presenting mechanism, or that mechanism which presents the side-creased bag to the folding or bottom-creasing mechanism.

The last-named mechanism consists of the horizontal flat plate 306, which, during the return movement of the carriage 127, advances somewhat to meet it. As they meet, the folding-plate flattens out the bottom of the bag, pressing and creasing it until it lies flat and square, as shown in the central figure of the group illustrated in Fig. XXXIX of the drawings.

During the respective operations of the other elements immediately hereinbefore described the frame 201 is making its descent, impelled by the cam 30 working against the roller 224 of the lever 221 and the connecting mechanism which unites that lever to the frame 201 aforesaid.

At about the time when the operation of the folding-plate upon the bag above described takes place the frame 201 approaches the limit of its descent, carrying with it the depending rods 319, which respectively meet the stop-pins 321ª. The stop-pins elevate the rods 319 in the manner previously described, which raise the lifting-bars 309 with the upper feed-plate 302, with which they are connected.

The stop-pins and the mechanism through which they operate the feed-plate 302 constitute feed-plate-operating mechanism, which, operating in the manner described to separate the plates 302 and 295, prepares those plates for the reception of the square bottom of the bag, which through the continued movement of the frame 127 is passed between them. When the bottom of the bag is well inserted between the feed-plates, the frame 201 begins its ascent. The lifting-bars 309, under the impulse of their springs 313, being no longer sustained by the stop-pins 321ª, descend and clamp the folded and creased square bottom of the bag firmly between the feed-plates 295 and 302. When this is accomplished, the fingers 180, again freed from the operation of the operating-bar 116, again close, and the frame 201, continuing to rise, completely liberates the bag from them. The mechanism, therefore, operating to lift the frame 201 and to close the fingers 180 constitutes bag-releasing mechanism.

Upon the closing of the fingers 180, last described, the clutch members 266 and 267 are brought into engagement by the cam-groove 275, through which operation motion is imparted through the shafts 9, 250, and 247 to the shaft 240, which drives the machine, and through the shaft 240 to the shaft 229, geared to the feed-plates, as hereinbefore set forth.

Upon the operation of the bag-releasing mechanism, the bag being held between the feed-plates 295 and 302, succeeds the operation of the corner-stitching mechanism, which consists of the movement of the feed-plates through the operating sewing-machine heads. It being essential to the attainment of the object of my invention that the lines of stitches across the bag-corners should be parallel and should meet the respective corners at the same angle, the feed-plates, with their actuating mechanism, constitute not only feeding mechanism, but alining mechanism—that is, mechanism for maintaining proper alinement. The corner-stitching mechanism continues to operate during the ascent of the frame 201 as well as during an interval that the frame remains stationary at the upward limit of its travel. It also continues during the descent of said frame until the clutch members 266 and 267 are separated through the operation of the cam-groove 275 upon the clutch-lever 271.

From the time that the bag is completely liberated from the fingers 180 by means of the upward movement of the frame 201, in the manner immediately hereinbefore described, the finger-head, its carriage 127, the jaws 82, and the frame 135 operate in precisely reverse order from that already described, until the fingers 180 are again brought to the starting position (shown in Fig. I) above described. In the position of the parts shown in Fig. I the machine-heads are at the upward limit of their vertical movement and are occupying at that limit the interval of rest previously referred to. That time being that at which the sewing-machines are the only operative parts, is the most favorable for the feeding of the bags to the fingers. By the time the newly-fed bag, that is to say, the second one which may be fed to the fingers 180 during the movements previously described, (the frame 201 having made its descent,) comes opposite to the folding-plate 306 the frame 367, actuated by its lever 371, and the groove 23 of the cam 21, will have advanced until the driving-rod 381 impinges against the rearward arch 298 of the feed-plate frame and begins to drive it toward its starting-point, the dogs 285 and 288 having been previously released by impingement against the arm 300. This operation, or that which I shall hereinafter denominate "feed-plate-returning mechanism," is that which causes the folding-plate 306 to advance to meet the return movement of the fingers 180, as set forth in the description of the bag-folding or bottom-creasing mechanism.

The operations of the chain-stitch-severing mechanism and of the bag-discharging mechanism have already been described, and it will suffice in this connection to remark that the continued advance of the frame 367, which completely restores the feed-plates to their starting position, also operates the chain-stitch-severing mechanism and the bag-discharging mechanism in the manner already described.

By following the steps of the operation above set forth a bag will have been completely sewed across the corners of its bottom by the time the second bag is fed by the fingers 180 between the feed-plates 295 and 302; but the first-fed bag will not be ready for discharge from the feed-plates, because it is necessary to retain it to preserve the chain-stitches in the operation of the feed-plates with respect to the machine. Consequently the operation of the chain-severing mechanism and the bag-discharging mechanism last above referred to will be abortive, no bag being ready to be discharged. When, however, the second bag has been cornered and the third one is being presented in the manner above described to the folding-plate 306, the first bag, that is to say, the one first introduced into the machine, will have been clamped between the jaw-plates 354. Consequently its chain, upon the second advance of the frame 367, will be severed, and the bag itself will be caught between the rods 390 and carried back with the frame 367 until it is brought to a point above the discharge-chute 414, where, in the manner above described, it will be dropped and discharged.

In the foregoing specification I have described that which I at present regard as the preferred embodiment of my invention, but without the intention of in any wise limiting myself to the details of construction therein set forth.

The machine illustrated and described through its successive movements is designed to produce upon a bag, for the purpose specified, a succession of mechanical operations which, as I now view the matter, will turn out a bag in the most perfect and complete form. Therefore not only is the machine susceptible of wide variation as to its details, but a number of its operative parts which I regard as desirable for performing the successive functions of the complete machine, as herein exhibited, may be eliminated without depriving such an embodiment of my invention of its essential features and without destroying its integrity as a completely-operative machine. For example, in its simplest aspect as an operative whole the machine comprehends those elements enumerated in claims 1 and 2. These claims are understood to define a machine which is adapted to produce across the corners of a previously-formed bag parallel lines of stitches that traverse the corners, respectively, at certain equal angles. Now it is preferable in a complete machine to automatically perform all those operations upon the bag that are necessary to adapt it for the reception by the feeding and alining mechanism enumerated in claims 1 and 2. For example, it is desirable that the bag should be first mechanically creased as to its sides, that it should be mechanically folded as to its bottom, and that it should be mechanically instead of manually presented to the stitching mechanism or the feeding mechanism thereof. The addition of combinations of elements for performing these several functions is preferable because, although it is possible to omit them, yet their presence produces a more complete and highly-organized automatic machine, which constitutes the complete embodiment of my invention. It may also be noted that certain combinations of mechanical elements defined in certain of the claims omit the stitching mechanism. This is done because such combinations perform a complete function in themselves without reference to the stitching mechanism. For example, mechanism which creases the sides of a bag at right angles to its seams and which folds its corners into opposite outwardly-extending points accomplishes that result independently without regard to the stitching mechanism.

Having premised so much as to the view which I take of the scope of the invention, I shall, in the claims presented, more narrowly and accurately analyze the invention into each combination of elements into which it is divisible generically and specifically.

What I claim is—

1. The combination with a frame and stitching mechanism, of alining and feeding mechanism operatively connected with the stitching mechanism, and adapted to feed a previously-formed bag-bottom to the stitching mechanism substantially as set forth.

2. The combination with a frame and a pair of oppositely-disposed sewing-machines, separated so as to allow the passage of a bag-body between them, of alining and feeding mechanism, operatively connected with the stitching mechanism, and adapted to clamp and feed a folded flat bottom of a bag thereto, substantially as set forth.

3. The combination with a frame, stitching and feeding mechanism, of bag-presenting mechanism adapted to present a previously creased and folded bag to the feeding and stitching mechanism, substantially as set forth.

4. The combination with a frame and stitching mechanism, of mechanism for supporting a bag vertically, and bag-bottom-folding mechanism adapted to fold the bottom of the bag before it is fed to the stitching mechanism, substantially as set forth.

5. The combination with a frame, stitching mechanism, and bag-feeding mechanism for feeding a bag stitch by stitch through the stitching mechanism, of bag-presenting mechanism, and bag-folding mechanism, substantially as set forth.

6. The combination with a frame, stitching mechanism, bag-feeding mechanism for feeding a bag stitch by stitch through the stitching mechanism, and bag-presenting mechanism, of bag-folding mechanism intermediate said stitching and presenting mechanisms, substantially as set forth.

7. The combination with a frame, and a plurality of stitch-forming mechanisms, of clamping feeding mechanism common to the stitch-forming mechanisms, and means for causing said feeding mechanism to clamp and hold a previously-folded bag-bottom, and to carry the same through the stitch-forming mechanisms while thus clamped and held, substantially as set forth.

8. The combination with a frame-feeding mechanism and stitching mechanism, of bag-presenting mechanism, side-creasing mechanism, and bag-folding mechanism adapted to operate upon the bag prior to its presentation to the stitching mechanism, substantially as set forth.

9. The combination with a frame and stitching mechanism, of bag-presenting mechanism, feeding mechanism and folding mechanism, substantially as set forth.

10. The combination with a frame and stitching mechanisms, of a feeding mechanism common to the stitching mechanisms comprising separable elements adapted to clamp a previously-folded bag-bottom between them, and mechanism for actuating the separable elements, substantially as set forth.

11. The combination with a frame and stitching mechanisms, of a feeding mechanism common to the stitching mechanisms comprising spring-actuated separable elements adapted to clamp a previously-folded bag-bottom between them, and mechanism for actuating the separable elements against the force of their spring-power, substantially as set forth.

12. The combination with a main frame, machine-head frame movable therein, and sewing-machines carried upon the latter, of feeding mechanism carried upon the machine-head frame, and comprising separable spring-actuated elements, of bars upon one of said elements adapted to separate it from its companion, and an obstructive element projecting in the path of the bars and adapted to operate through them the elements of the feeding mechanism to which it is attached, with each movement of the machine-head frame, substantially as set forth.

13. The combination with a frame and stitching mechanism, of bag-bottom-folding mechanism, feeding mechanism and return mechanism therefor, substantially as set forth.

14. The combination with a frame and stitching mechanisms, of a feed mechanism common to the stitching mechanisms comprising upper and lower feed-plates operatively united, and feed-plate-operating mechanism, substantially as set forth.

15. The combination with a frame and stitching mechanism, of feeding mechanism comprising upper and lower feed-plates, the lower plate divided by a longitudinal slit, needle-slits in the respective plates, and feed-plate-operating mechanism, substantially as set forth.

16. The combination with a frame and stitching mechanism, of separable feed-plates, a folding-plate upon one of the feed-plates, feed-plate-operating mechanism, and bag-presenting mechanism, substantially as set forth.

17. The combination with a frame and stitching mechanism, of a pair of separable feed-plates, and mechanism for intermittently operating the feed-plates to advance them stitch by stitch in one direction, and to slide them by a continuous movement in the opposite direction, substantially as set forth.

18. The combination with a frame and stitching mechanism, of bag-presenting mechanism movable to and from the stitching mechanism, and feeding mechanism movable in opposite directions through the stitching mechanism, substantially as set forth.

19. The combination with a frame and stitching mechanism, of bag-presenting mechanism, feeding mechanism comprising folding mechanism, means for operating the bag-presenting mechanism, and the feeding mechanism, said means timed to operate to cause the feeding mechanism to make its return movement each time the bag-presenting mechanism approaches the stitching mechanism, substantially as set forth.

20. The combination with a frame and stitching mechanisms of a single mechanism for feeding a folded bag-bottom through the stitching mechanisms, and maintaining said bag-bottom in proper alinement, and chain-stitch-severing mechanism, substantially as set forth.

21. The combination with a frame, stitching mechanism, and folding mechanism, of bag-bottom-feeding mechanism, and mechanism for retaining a plurality of the bags within the feeding mechanism to preserve a chain-stitch between them, substantially as set forth.

22. The combination with a frame and stitching mechanism, of bag-bottom-feeding mechanism, mechanism for retaining a plurality of bags within the feeding mechanism, and chain-stitch-severing mechanism, coöperating with the feeding mechanism to sever the chain connecting the last bag to the others in the feeding mechanism, at required intervals, substantially as set forth.

23. The combination with a frame, stitching mechanism, feeding mechanism, and chain-stitch-severing mechanism, of bag-discharging mechanism, coöperating with the chain-stitch-severing mechanism to receive the bag from the feeding mechanism as the chain-stitches are severed, substantially as set forth.

24. The combination with a bag-corner-stitching machine, of chain-stitch-severing mechanism, consisting of a frame, a plurality of pairs of shears, and mechanism for operating the shears, substantially as set forth.

25. The combination with a bag-corner-stitching machine, of chain-stitch-severing mechanism consisting of the combination with a frame, cutter-carriage, fixed and movable shear-blades carried thereon, an operative element in the path of the movable shear-blade, and actuated by the carriage, and means for imparting motion to the carriage, substantially as set forth.

26. In a bag-corner-stitching machine, the combination with a main frame and bag-discharging movable frame, of reciprocatory rods in the bag-discharging frame, and means for actuating the rods to receive and discharge a bag held between them, substantially as set forth.

27. In a bag-corner-stitching machine, the combination with a main frame and movable bag-discharging frame, of reciprocatory rods carried in the frame, chain-stitch-severing mechanism operatively connected with the rods, and mechanism for operating the rods, substantially as set forth.

28. The combination with a main frame, stitching mechanism and feeding mechanism, of a bag-discharging frame carried upon the main frame, reciprocatory rods therein adapted to be brought into alinement with the feeding mechanism each time the latter travels through the machine, and driving mechanism, substantially as set forth.

29. The combination with a main frame, stitching mechanism and feeding mechanism, of a bag-discharging frame, reciprocatory rods therein adapted to be brought into alinement with the feeding mechanism each time it is fed through the machines, and chain-stitch-severing mechanism located between the rods and the feeding mechanism, and adapted to sever a complete bag from the feeding mechanism so that it may be carried backward and discharged by the rods, and driving mechanism for operating the several parts, substantially as set forth.

30. As a part of a bag-corner-stitching machine, the combination with a main frame and bag-discharging frame movable thereon, of reciprocatory rods working in the latter projections thereon, and cams upon the main frame in the path of the projections upon the rods for actuating them, substantially as set forth.

31. In a bag-corner-stitching machine, the combination with a main frame and bag-discharging frame movable thereon, of reciprocatory rods, chain-stitch-severing mechanism connected therewith, projections upon the rods, and cams upon the main frame in the path of the projections for operating the parts, substantially in the manner and for the purpose specified.

32. The combination with a frame, of mechanism adapted to firmly support a side-stitched bag from within, and folding mechanism coöperating therewith to press and crease the bottom of the bag, substantially as set forth.

33. The combination with a frame, of mechanism adapted to expand and hold a bag from within, and mechanism carrying a bag-folding plate coöperating with the first-named mechanism to press and crease the bottom of the bag, substantially as set forth.

34. The combination with a frame, stitching mechanism, and feeding mechanism, of bag-receiving mechanism, and bag-presenting mechanism, substantially as set forth.

35. The combination with a frame, stitching mechanism and its feeding mechanism, of bag-presenting mechanism adapted to supply a bag to the feeding mechanism, and bag-releasing mechanism adapted to release the bag from the presenting mechanism, substantially as set forth.

36. The combination with a frame, driving mechanism, and vertically-movable sewing-machines connected with the driving mechanism, of vertically-stationary bag-presenting mechanism, coöperating with the sewing-machines, substantially as set forth.

37. The combination with a frame, driving mechanism, and intermittently-actuated sewing-machines thereon, of bag-receiving mechanism, and bag-presenting mechanism timed to present a bag to the sewing-machines at the beginning of each of their intermittent activities, substantially as set forth.

38. The combination with a frame, driving mechanism, and vertically-movable sewing-machines carried in the frame, of mechanism connecting the sewing-machines with the driving mechanism, and adapted to cause them to operate during their vertical ascent and descent, and to cause them to come to a rest near their lower limit of movement, substantially as set forth.

39. The combination with a frame, driving mechanism, and intermittently vertically movable sewing-machines, of bag-receiving mechanism, the bag-receiving mechanism being timed to receive a bag when the sewing-machines are vertically stationary, substantially as set forth.

40. The combination with a frame, feeding and stitching mechanism, bag-holding mechanism, and side-chain-severing mechanism, adapted to coöperate substantially as and for the purpose specified.

41. The combination with a frame, feeding and stitching mechanism, and bag-holding mechanism, of side-creasing mechanism coöperating with the bag-holding mechanism, substantially as set forth.

42. The combination with a frame, stitching mechanism, and bag-receiving mechanism, consisting of separable fingers, bag-holding mechanism, and finger-reversing mechanism, substantially as set forth.

43. The combination with a frame, stitching mechanism, bag-expanding mechanism, bag-holding mechanism, and mechanism for reversing the expanding mechanism, substantially as set forth.

44. In a machine for creasing and folding a bag, means for folding the bag-bottom in shape to be corner-stitched, comprising bag-holding mechanism, and side-creasing mechanism, substantially as set forth.

45. The combination with bag-holding mechanism, and reversible bag-expanding mechanism, constituting side-creasing mechanism, substantially as set forth.

46. The combination with bag-receiving mechanism, comprising movable fingers, of bag-holding mechanism, and side-creasing mechanism adapted to reverse and separate the fingers within the bag, substantially as set forth.

47. The combination with bag-receiving mechanism, bag-expanding mechanism, and bag-holding mechanism, of side-creasing mechanism, and bag-lifting mechanism, substantially as set forth.

48. The combination with bag-receiving mechanism, bag-expanding mechanism, and bag-holding mechanism, of side-creasing mechanism, bag-lifting mechanism, and bag-bottom-folding mechanism, substantially as set forth.

49. The combination with the frame, driving mechanism, and stitching mechanism of a machine, of bag-receiving mechanism, bag-expanding mechanism, bag-holding mechanism, side-creasing mechanism, adapted to crease the bag at right angles to the plane of movement of the bag-expanding mechanism, bag-lifting mechanism adapted to lift the bag from the side-creasing mechanism to present a fullness at the bottom, and bag-folding mechanism adapted to fold the bottom into shape to be corner-stitched, substantially as set forth.

50. The combination with the frame, driving mechanism, and stitching mechanisms of a machine, of bag-receiving mechanism, bag-expanding mechanism, bag-holding mechanism, side-creasing mechanism, adapted to crease the bag at right angles to the plane of movement of the bag-expanding mechanism, bag-lifting mechanism adapted to lift the bag from the side-creasing mechanism to present a fullness at the bottom, bag-folding mechanism adapted to fold the bottom into shape to be corner-stitched, and bag-presenting mechanism adapted to present the folded bottom to the stitching mechanisms, substantially as set forth.

51. The combination with the frame, driving mechanism, and stitching mechanisms of a machine, of bag-receiving mechanism, bag-expanding mechanism, bag-holding mechanism, side-creasing mechanism, adapted to crease the bag at right angles to the plane of movement of the bag-expanding mechanism, bag-lifting mechanism, adapted to lift the bag from the side-creasing mechanism to present a fullness at the bottom, bag-folding mechanism adapted to fold the bottom into shape to be corner-stitched, bag-presenting mechanism adapted to present the folded bottom to the stitching mechanisms, and bag-releasing mechanism, substantially as set forth.

52. The combination with a frame, driving mechanism, and stitching mechanism, comprising feed mechanism, of side-creasing mechanism, bag-lifting mechanism, bottom-folding mechanism, and bag-presenting mechanism adapted to present the bag to the feeding mechanism, substantially as set forth.

53. The combination with a machine, driving mechanism and stitching mechanism, of side-creasing mechanism, bag-lifting mechanism, bag-folding mechanism incorporated with the feeding mechanism, and bag-presenting mechanism, the bag-presenting mechanism and the feeding mechanism being timed to advance at proper intervals toward each other, thereby folding the bag-bottom and presenting it to the feeding mechanism by one operation, substantially as set forth.

54. In a bag-corner-stitching machine, the combination with bag-expanding mechanism, adapted to expand a side-sewed bag between its seams, bag-holding mechanism adapted to retain the expanded edges of the bag, and side-creasing mechanism, substantially as set forth.

55. In a bag-corner-stitching machine, the combination with a pair of separable fingers adapted to expand a bag between its seams, bag-holding mechanism adapted to clamp the edges of the expanded bag, mechanism for operating the holding mechanism to release the tension upon the bag, and finger-reversing mechanism adapted to side-crease the bag transversely to its seams, substantially as set forth.

56. The combination with a frame, stitching mechanism, and driving mechanism, of a horizontally-movable finger-head, fingers, and finger-separating mechanism thereon, a finger-actuating bar in the path of the finger-expanding mechanism, a movable member upon which the actuating-bar is carried, and mechanism operatively connecting the movable member, and the finger-head to the driving mechanism, substantially as set forth.

57. The combination with a frame, stitching mechanism, driving mechanism, and a movable finger-head connected with the driving mechanism, of jaw-carriages movable to and from the finger-head, and jaw-carriage-actuating mechanism operatively connected with the driving mechanism, substantially as set forth.

58. The combination with a frame, stitching mechanism, and driving-shaft, of a movable finger-head operatively connected with the driving-shaft, clamping-jaw carriages movable to and from the finger-head, and levers operatively connecting the carriages, respectively, with the driving-shaft, substantially as set forth.

59. The combination with a frame, stitching mechanism, and driving-shaft, of a movable finger-head operatively connected with the driving-shaft, clamping-jaw carriages also operatively connected with the driving-shaft, clamping-jaws upon the carriages, and mechanism for operating the carriages, substantially as set forth.

60. The combination with a frame, stitching mechanism, and driving-shaft, of a movable finger-head operatively connected with the driving-shaft, clamping-jaw carriages movable to and from the finger-head, and operatively connected with the driving-shaft, separable clamping-jaws upon the carriages, and mechanism for intermittently actuating the jaws, substantially as set forth.

61. The combination with a frame, stitching mechanism, driving-shaft, and movable finger-head operatively connected with the driving-shaft, of clamping-jaw carriages movable to and from the finger-head, and operatively connected with the driving-shaft, spring-actuated clamping-jaws upon the carriages, and jaw-separating plungers operatively connected with the driving-shaft, substantially as set forth.

62. The combination with a frame, stitching mechanism, driving-shaft, and movable finger-head operatively connected with the driving-shaft, of clamping-jaw carriages movable to and from the finger-head, levers operatively connecting the same with the driving-shaft, clamping-jaws upon the respective carriages, jaw-actuating mechanism, and levers connecting the same with the driving-shaft, the carriage-levers and the jaw-actuating plungers timed to operate intermittently and at regular intervals, substantially as set forth.

63. The combination with a main frame, stitching mechanism driving-shaft and movable finger-head operatively connected with the driving-shaft, of a clamping-head frame also operatively connected with the driving-shaft, a plunger carried in the clamping-head frame, and operatively connected with the driving-shaft, an actuating-bar upon the plunger operatively connected with the finger-head, clamping-jaws carried upon the clamping-jaw frame, and operatively connected with the driving-shaft, substantially as set forth.

64. The combination with a main frame, stitching mechanism, driving-shaft, and movable finger-head operatively connected with the driving-shaft, of a movable clamping-head frame also connected with the driving-shaft, a plunger and actuating-bar movable therein, and operatively connected with the driving-shaft and with the finger-head, respectively, clamping-jaws, levers loosely connected therewith to operate the same at one end, and operatively connected with the driving-shaft at the other end, whereby the vertical movement of the clamping-jaw frame may be accomplished without interfering with the operation of the clamping-jaws, substantially as set forth.

65. The combination with a frame, feeding and stitching mechanism, and driving-shaft, of traveling bag-holding clamping-jaws operatively connected with the shaft, substantially as set forth.

66. The combination with a frame, feeding and stitching mechanism, and driving-shaft, of clamping-jaws and spring-actuated levers operatively connecting the jaws with the shaft, substantially as set forth.

67. The combination with a frame, stitching mechanism, clamping-jaw carriages movable to and from each other, spring-actuated levers operatively connecting the carriages with the shaft, spring-actuated bag-holding clamping-jaws upon the carriages, spring-actuated levers operatively connected at one end to the shaft, and plungers connected with them at the other end for separating the clamping-jaws, substantially as set forth.

68. The combination with a frame, stitching mechanism, and driving-shaft, of a movable finger-head carriage connected with the driving-shaft, finger-head therein and independent mechanism for reversing the finger-head within its carriage also connected with the driving-shaft, substantially as set forth.

69. The combination with a frame, stitching mechanism, and driving-shaft, of a finger-head carriage operatively connected to the driving-shaft, finger-head therein, a recessed flange upon the finger-head, a pin-carriage provided with a pin working in the recess, and mechanism connecting the pin-head carriage with the driving-shaft, substantially as set forth.

70. The combination with a frame, stitching mechanism, and driving-shaft, of a finger-head, bag-expanding fingers thereon, a block, levers connecting the block with the fingers for expanding the latter, and mechanism for actuating the block, substantially as set forth.

71. The combination with a frame, stitching mechanism, and driving-shaft, of a finger-head, bag-expanding fingers therein, a spring-actuated block, levers connecting the block with the fingers for expanding the latter, and mechanism for actuating the block, substantially as set forth.

72. The combination with a frame, stitching mechanism, and driving-shaft, of a finger-head, and bag-expanding fingers thereon, a vertically-movable block, operatively connected with the fingers, a rod connected with the block, and mechanism connected with the driving-shaft for reciprocating said rod, substantially as set forth.

73. The combination with a finger-head, and transversely-movable finger-blocks thereon, of bell-crank levers loosely secured to the opposite walls of a recess in the finger-head, an actuating-block located within the recess in the finger-head, and loose connections between the levers and said actuating-block, substantially as set forth.

74. The combination with a frame, driving-shaft and movable machine-head frame operatively connected to the driving-shaft, of bag-presenting mechanism, also connected to the driving-shaft, sewing-machines upon the machine-head frame, and mechanism for operating the same, substantially as set forth.

75. The combination with a frame, driving-shaft, machine-head frame, and machines thereon, of bag-presenting mechanism, machine-head-driving mechanism, clutch mechanism upon the same, and mechanism for automatically throwing the clutch mechanism into and out of operation through the movement of the machine-head frame, substantially as set forth.

76. The combination with a frame, main driving-shaft, and second shaft parallel thereto, of a machine-head frame operatively connected with the main driving-shaft, bag-presenting mechanism also connected therewith, sewing-machines upon the machine-head frame, sewing-machine-driving shaft, a fixed gear upon the latter, a shaft connecting the second driving-shaft with the machine-head-driving shaft, and a loose gear thereon meshing with the gear upon the machine-head shaft, substantially as set forth.

77. The combination with a frame, driving-shaft, and movable machine-head frame connected therewith, of sewing-machines upon the frame, feeding mechanism therein, spring-actuated plungers carried upon the machine-head frame, fixed and movable jaws upon the opposing ends thereof, and lugs upon the main frame in the path of the plungers, said lugs being adapted to actuate them, through the reciprocation of the machine-head frame to support a bag during the return movement of the feed mechanism, and before the chain-stitches which unite the bags are severed, substantially as set forth.

In testimony of all which I have hereunto subscribed my name.

THOMAS B. FULLER.

Witnesses:
P. M. BRIGGS,
M. W. REED.